(12) United States Patent
Holland et al.

(10) Patent No.: US 7,739,899 B1
(45) Date of Patent: Jun. 22, 2010

(54) LEAK DETECTION USING STRUCTURE-BORNE NOISE

(75) Inventors: Stephen D. Holland, Ames, IA (US);
Dale E. Chimenti, Ames, IA (US);
Ronald A. Roberts, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 621 days.

(21) Appl. No.: 11/413,523

(22) Filed: Apr. 28, 2006

Related U.S. Application Data

(60) Provisional application No. 60/676,428, filed on Apr. 29, 2005.

(51) Int. Cl.
*G01M 3/04* (2006.01)

(52) U.S. Cl. .................. 73/40.5 R; 73/45.5 A; 73/49; 73/52

(58) Field of Classification Search ............... 73/49.3, 73/52, 40.5
See application file for complete search history.

(56) References Cited

U.S. PATENT DOCUMENTS

| | | | | |
|---|---|---|---|---|
| 5,341,670 | A | * | 8/1994 | Brook et al. ............ 73/40.5 A |
| 6,138,512 | A | * | 10/2000 | Roberts et al. ............ 73/570 |
| 6,701,776 | B2 | * | 3/2004 | Stetter ................. 73/49.2 |
| 6,804,992 | B2 | * | 10/2004 | Goodman et al. ........ 73/40.5 A |
| 6,886,389 | B1 | * | 5/2005 | Hagar .................. 73/40.7 |
| 6,995,038 | B2 | * | 2/2006 | Egawa et al. ............ 438/106 |

OTHER PUBLICATIONS

Foster, J.L., "A debris avoidance feasibility study for robotic satellites", The Orbital Debris Quarterly News, 8(3), 2-3, 2004.
Stansbery, E., et al., "Haystack orbital debris Radar measurements updates", The Orbit Debris Quarterly News, 9(1), 3-5, 2005i.
Crisco, P.H., "Historical small debris collision activities", The Orbital Debris Quarterly News, 8(4), 6-7, 2004.
Liou, J.C., "Collision activities in the future orbital debris environment", The Orbital Debris Quarterly News, 8(4), 8, 2004.
Bernhard, R.P., et al., "Orbital debris as detected on exposed spacecraft", The Orbital Debris Quarterly News, 2(4), 3-4, 1997.
Schonberg, W.P., "Protecting spacecraft against meteoroid/orbital debris impact damage: An overview", Space Debris, 1, 195-210, 2000.
Anz-Meador, P., "ISS Space Shuttles examined for debris impacts", The Orbital Debris Quarterly News, 6(2), 3, 2001.
Oberg, J., "Crews find 'Culbrit' in space station leak www.msnbc.msn.com,", Jan. 11, 2003, (Date retrieved: Mar. 11, 2005).

(Continued)

*Primary Examiner*—J M Saint Surin
(74) *Attorney, Agent, or Firm*—McKee, Voorhees & Sease, P.L.C.

(57) ABSTRACT

A method for detection and location of air leaks in a pressure vessel, such as a spacecraft, includes sensing structure-borne ultrasound waveforms associated with turbulence caused by a leak from a plurality of sensors and cross correlating the waveforms to determine existence and location of the leak. Different configurations of sensors and corresponding methods can be used. An apparatus for performing the methods is also provided.

14 Claims, 9 Drawing Sheets

OTHER PUBLICATIONS

Holland, S., et al., "Two-sensor ultrasonic spacecraft leak detection using structure-borne noise", Acoustic Research Letters Online (ARLO), 6(2), 63-68, 2005.

National Aeronautics and Space Administration, International space station complex operations emergency procedures: all expedition flights, Mission Operations Directorate Operations Division, Aug. 16, 2000.

Kim, J.W., et al., "ISS leak localization using attitude response," AIAA Guidance, Navigation, and Control Conference, Montreal, CA, Aug. 2001, AIAA paper #01-4272.

Zak, A., Cosmonauts' flight plan: find the leak on MIR, www.space.com, Mar. 31, 2000, (Date retrieved: Mar. 23, 2005).

Semkin, N.D., et al., "A device for detecting the location of a gas leak in a spacecraft module," Instru. Exper. Techn. 46(5), 711-716, 2003.

Studor, G., "Ultrasonic Detectors in Space, www.ctrlsys.com", May 22, 2002, (Date retrieved: Mar. 23, 2005).

Corsaro, R., et al., "PINDROP—An acoustic particle impact detector," The Orbital Debris Quarterly News, 8(3), 3-4, 2004.

Kim, J.W., "International space station leak localization using vent torque estimation", 55th International Astronautical Conference, Vancouver, BC, IAC-04-A.4.10, Oct. 2004.

Anon, "Stopping leaks in space", Machine Design, 75, 32, 2003.

Ziola, S.M., et al., "Source location in thin plates using cross-correlation", J. Acou. Soc. Am., 90, 2551-2556, 1991.

Rewerts, L.E., et al., "Dispersion compensation in acoustic emission pipeline leak location", in Review of Progress in QNDE, 16A, 427-434, 1997.

Rewerts, L.E., et al., "The role of propagation characteristics in acoustic emission pipeline leak location", in Review of Progress in QNDE, 17A, 501-508, 1998.

* cited by examiner

LEAK DETECTION USING STRUCTURE-BORNE NOISE

RELATED APPLICATIONS

This application claims priority to U.S. Provisional Patent Application No. 60/676,428, filed Apr. 29, 2005, hereby incorporated by reference in its entirety.

GRANT REFERENCE

The work presented in this application was supported in part by a federal grant from the NASA, Grant No. NAG-1-02098, the government may have certain rights in this invention.

BACKGROUND OF THE INVENTION

The present invention relates to leak detection and determining leak location. To assist in understanding the present invention, problems related to detecting and locating air leaks in spacecraft are described. It should be understood, however, that the present invention can be used for detection of leaks and location of leaks in any number of other types of vessels, particularly pressure vessels, and is in no way limited to spacecraft.

It has been well known for a long time that orbital objects, such as meteoroids and space debris, are among the serious, but inevitable, threats to spacecraft intended for prolonged habitation. Technically, collisions with objects larger than 10-cm can be avoided using databases compiled by debris-tracking systems, such as the Haystack orbital debris radars and optical telescopes [1,2]. The strikes of small objects between 0.10 and 10.0 mm cannot, however, be avoided using the current devices. Furthermore, because the objects strike the spacecraft at high speeds, up to 10 to 15 km/s [3], even small particles in the size range of 1 mm could result in penetration of the pressure vessel and subsequent loss of air.

Referring to several reports [4-7], the major sources of the small particles are fragments of payloads, paint flakes, solid rocket motor slag and discharge, exploded rocket bodies, and extraterrestrial micrometeorites. Clearly, there will a higher probability of collisions with smaller objects if space exploration includes trips with longer operational times.

An example of a current long-endurance spacecraft is the International Space Station (ISS), now orbiting in low Earth orbit (LEO) with an altitude between 360 km and 440 km with an inclination of 51.6 degrees. It is designed to provide an Earth orbiting facility in order to develop advanced technology for human and robotic exploration of space. Ever since the ISS has launched in 1998, there have been many component replacements, which are mainly caused by the impact of high-speed micrometeorites and space resident debris [8]. In particular, the impacts of small objects cause air leaks when they strike a pressurized module on the ISS. As reported by NASA in January 2004 [9], parts of the ISS were nearly closed off for three weeks due to the air leaks. Although the size of the air leak was too small to endanger the crew and mission immediately, it was a time-consuming process to find and seal the leaks.

Accordingly, immediate location of the source of the leaks on the ISS is essential to provide the crew with maximum safety, minimize unnecessary mission effort, and maintain the operational status. By doing so, the crew can perform increasingly ambitious mission goals for longer periods with less ground supports. However, regardless of size of the air leaks, the detection and location of air leaks is a very difficult and time-consuming process because the size of an ISS module and the complexity of its construction. The crew cannot inspect the entire series of modules immediately. In addition, the ultrasound noise generated by escaping air at supersonic speed from small holes into the vacuum of space is not audible or detectable inside the ISS because of the nature of the leaks. Leaks on spacecraft occur from one atmosphere into vacuum and produce almost none of the characteristic detectable high-frequency sound, such as that typically exploited by industrial leak detection apparatus.

Conventionally, the crew on the ISS follows the sequential module leak isolation process [10]. The process involves very inefficient and time-consuming tasks, where the crew monitors the pressure difference while sequentially closing each hatch. Because it is not easy to discern very small pressure differences, the isolation process still does not reduce the leak detection time and risk of the crew's safety. Compared to the ISS, the MIR, a Russian space station, employs airflow induction sensors installed in the hatchways to continually monitor airflow and its rate of change [11]. Since the airflow induction sensors are designed to detect the very small changes in the airflow, they are also sensitive to the circulating air in a module. So, the crew must stop all the venting systems in a suspicious module to find air-leaks, and this action could cause more serious problems. In addition, pinpointing a leak location is not possible because the sensors are designed only to localize leaking to a specific module losing a measurable amount of air, and not to find its exact location within the module.

With the demands of more efficient leak detection systems on the ISS, active research has been performed to develop air leak detection systems. In 2000, Russian engineers have put their best efforts into an acoustic monitor called "OT 2-K" to detect air leaks on the MIR [12]. This sensor directs possible leak locations by measuring the noise level generated by escaping air. In the lab test, the sensor can detect the airborne noise in air escaping from a surgical needle at a distance of approximately 5 m. However, due to the nature of its working principle, it is not an efficient detector or locator of leaks inside a module. Instead, the crew must use the sensor outside of the module, an extremely time-consuming and often dangerous activity. Semkin et. al [13] have proposed a multiparameter transducer, which consists of one ionization sensor, four piezoelectric microphones, two thermocouple sensors, and a data processing unit in a single package. The dimensions of the transducer are 80×100×80 mm, and its weight is less than 0.35 kg. Analyzing the measurements obtained by each sensor, the transducer is capable of detecting gas leaks on the MIR from the holes with 0.1~5 mm in diameter at a distance of 1.5 m from the transducer. However, the detectable zone is very small and restricted so that it is not a fully functional sensor to locate air leaks on a large-scale space station.

Recently, a company, called CTRL Systems, Inc., has developed and tested an ultrasonic leak detector (UL 101®) to locate air leaks on the ISS [14]. The detector is a hand-held, non-destructive diagnostic tool, which detects ultrasound in a narrow frequency band around 40 kHz. The outputs are supplied to a headset as well as to an analog meter. This method, however, is based on the same principle as most of the other industrial leak detectors, and is also not efficient for locating air leaks on the ISS because it was originally designed to detect leaks from pressurized vessels, where air is escaping into an atmospheric environment of 1 bar from a pressurized vessel at a pressure of at least 1 bar gage, or 2 bar absolute. On the contrary, the air leaks on the ISS are leaks into vacuum, where the direction of the escaping airflow is into the vacuum of space. Corsaro et al. [15] have proposed a prototype system of an acoustic particle impact detector, called "Particle Impact Noise-Detection and Ranging On Autonomous Platform (PINDROP)". The PINDROP is designed to detect hypervelocity impacts by small particles and locate the impact sites using the propagation characteristics of the acoustic wave generated on a panel. The detector consists of a conventional aerogel particle-capture array to collect and characterize the small particles in space, acoustic sensor to locate their impact sites and autonomous data acquisition unit to process the collected data. As a active material in an acoustic sensor, poly-vanylidene fluoride (PVDF) is selected, owing to its unique advantages over other piezoelectric materials, such as high sensitivity in response to sudden changes in strain, very low mass, and flexible installation. To predict accurately the signal arrival time, an acoustic propagation model is developed and embedded in the data acquisition unit. This model is used to locate the impact sites using the relative time-of-arrival at three or more sensor locations. Although this detector is not designed to find the exact location of air leaks on the ISS, it provides the crew with valuable information when they are tracking down suspicious leak locations.

Kim et. al [11, 16] have developed a leak localization software for the ISS. The software uses the measurements from pressure gages, spacecraft attitude and rate sensors. When air leaks occur, the vent thrust generates a small torque on the space station. To preserve the spacecraft's attitude, a reaction torque is needed to stabilize the ISS, depending on the size and location of the leak. The software infers from the dynamics of the ISS stabilization, considering the geometrical structure of the ISS, a probable leak location and the estimated hole size. According to the developers, their software can locate holes with a diameter as small as 0.4 inches (>>1 cm). With its outstanding functionalities, NASA is planning to employ the software system on ISS in the near future [17]. In order to detect and predict the location of air leaks accurately, however, exact knowledge of the ISS geometric structure is required. If the spacecraft geometry changes, such as through the addition of more modules or docking with other spacecraft, the software must be entirely reconfigured to account for those variations in the spacecraft moment of inertia and mass.

In addition to developing the complex leak detection systems, it is desired to utilize the structure-borne noise so that the location of a leak is detected by remotely positioned sensors. One of the simple and widely used approaches is to use cross correlation. The technique assumes in the analysis that received signals by sensors at remote locations satisfy the conditions of a single mode of propagation with a non-dispersive (or frequency-independent) wave speed. Under the assumptions, the received signals are simply non-dispersed time-delayed replica of the signal generated at the leak. The time delay corresponds to the distance between the sensors and the leak source. They are, however, time-shifted with different amplitude because of differences in propagation paths of the signals. The location of peak on a time scale in the cross correlation function corresponds to the time delay, and, through the speed of sound in the structure, the location of the leak.

In 1969, White [18] first used a cross-correlation technique to determine a leak location on a thin plate, assuming that the structure-borne noise is propagating in all directions with the same propagation speed. The temporal shape of the measurements is also assumed to be unchanging with distance. However, the results of the cross correlation do not clearly show a large peak. Instead, it shows a gradual rise and fall of sinusoidal function. Ziola et. al. [19] demonstrates a simple leak location method using a very thin aluminum plate, in which the method utilizes the classical plate theory and cross-correlation technique. Given a priori knowledge of the wave speed in a certain frequency range, the method can properly locate the leaks in the thin plate. Their study is limited to very thin plates whose thickness is less than 2.5 mm.

Although a simple cross correlation method is marginally capable of locating the leaks, it provides unambiguous indications of a leak only if it satisfies the simplified assumption of a single mode of propagation with a non-dispersive (or frequency-independent) wave speed. In fact, the structure-bone noise in a plate-like structure, such as the outer skin of spacecraft, is evidently carried by multiple dispersive modes of plate wave propagation. In a dispersive medium, the structure-borne noise propagates with a different velocity at every frequency so that the cross correlation technique is not suitable to adequately provide an exact location of the leak source. The method provides much poorer results as the received signals become more dispersive. Examples of ambiguous indications in dispersive media are shown in References 20-23. In addition, the temporal shape of the propagating structure-borne noise does not remain in constant. Furthermore, the effect of the dispersion becomes more serious as the distance between the sensors at remote locations and the leak source increases. As a result, the cross correlation technique is not a viable option to locate leaks in dispersive media or structures.

In order to compensate the dispersion-related drawbacks of the cross correlation technique in source location, Rewerts et al. [20-21] have demonstrated a dispersion compensation method in a 1-dimensional structure for water-filled pipelines. This method isolates particular modes from the dispersed measurements as well as utilizing the advantages of the cross correlation technique. Steri et al. [22-23] have extended the work of Rewert, et al. and showed a robust mode-compensating leak location method in a highly dispersive structure, with a leak and sensors arranged in a collinear fashion. This method isolates the contributing modes of propagation and determines the compensation for the frequency dependence of the contributing mode wave speed. To adequately isolate the particular modes, it performs temporal and spatial Fourier transforms on the received signals. These works also emphasize that the signals need not be collected simultaneously for the cross correlations among several pairs of sensors, owing to the stationary property of the power spectrum of the cross-correlated signals.

Despite these works, significant problems remain in leak detection. What is needed is a sensitive and reliable means to locate an air leak in pressurized, habitable and long-endurance spacecraft. Such a method should be able to locate air leaks accurately with the requisite speed.

SUMMARY OF THE INVENTION

Therefore, it is a primary object, feature, or advantage of the present invention to improve over the state of the art.

It is a further object, feature, or advantage of the present invention to provide for rapid detection of air leaks in a spacecraft skin, such as those caused by impact with space debris or meteorites.

Another object, feature, or advantage of the present invention is the detection of air leaks in a spacecraft skin by using ultrasonic waves in the spacecraft skin and not just airborne noise.

Yet another object, feature, or advantage of the present invention is to provide a continuous system for leak detection and the determination of leak location.

A further object, feature, or advantage of the present invention is to provide for a method and system for detection of air leaks that is capable of accommodating multiple dispersive modes of plate wave propagation.

A further object, feature, or advantage of the present invention is to provide a framework for leak detection of a pressure vessel flexible enough to allow a number of different of sensor configurations and corresponding specific methodologies to be used.

A still further object, feature, of the invention is to provide a method for leak detection and location suitable for use with any number of types of pressure vessels.

One or more of these and/or other objects, features, or advantages of the present invention will be apparent from the specification and claims that follow.

In one embodiment, a coupled phased-array method is used. This method provides an all-encompassing data set to represent what could be measured if time and complexity were irrelevant. Such a method is impractical due the number of sensors and complexity of calculations required. However, use of this method is helpful in fully understanding the problems and issued involved.

In another embodiment, a two-dimensional phased array method is provided. This methodology reduces the quantity of data required in the coupled array measurement to a pair of independent, two-dimensional array measurements. For each array measurement, one sensor is fixed and the other is scanned across an array. This reduces the number of correlations relative to the coupled phase-array method.

In another embodiment, a distributed sensor is used. In this method, leaks are located using only correlations between signals from a few isolated point sensors. This method compares the measured correlations from a few arbitrarily distributed sensors with synthetic correlations calculated from all possible leak locations and identifies the closest match as the location of the leak.

In another embodiment, a dual-sensor method is used. In this method, leak detection is performed by measuring leak-into-vacuum cross-correlations of noise signals from two adjacent transducers as the transducer pair is rotated to determine the relative phase delay as a function of rotation angle. The direction to the leak is found from the variation of phase with angle of from synthetic aperture analysis. The leak is then located through triangulation from two or more sensor-pair locations.

According to one aspect of the invention, a method for detection of air leaks in a pressure vessel is provided. The method includes sensing structure-borne ultrasound waveforms from a plurality of sensors and determining when cross correlation between the waveforms indicates presence of a leak. The ultrasound waveforms are associated with turbulence caused by the leak. The method also provides for locating the leak using the cross correlation between the waveforms. The ultra sound waveforms may be in a range of about 300 kHz to 600 kHz. The present invention provides numerous configurations of sensors to be used along with corresponding methodologies as may be appropriate for different environments or applications of the invention. For example, the sensors may be configured as a two-dimensional phased array, distributed on an inner surface of the pressure vessel, or may include two rotatable sensors.

According to another aspect of the invention, a system for detection of leaks in a pressure vessel is provided. The system includes a plurality of acoustic sensors adapted for sensing structure-borne ultrasound waveforms associated with turbulence caused by a leak in the pressure vessel and an intelligent control, such as a computer or other computing device, operatively connected to the plurality of acoustic sensors. The sensors may be of different types, configured in different manners and corresponding methodologies are then used for leak detection and leak location. The pressure vessel may be a spacecraft.

According to another aspect of the present invention, a method for location of an air leak in a pressure vessel includes receiving a leak noise signal associated with the air leak in the pressure vessel at a plurality of sensor locations to provide a plurality of leak noise waveforms, cross correlating the leak noise waveforms, and determining location of the leak based on results of the step of cross correlating the leak noise waveforms. The results from the cross correlation are a function of the leak noise waveform as well as sensor parameters associated with the sensors. The sensor parameters can include the sensor locations, geometry, etc. A Fourier analysis may be applied to the results of the cross correlation to determine direction to the leak from the sensors. The location of the air leak may then be triangulated based on the direction to the leak from each sensor.

DETAILED DESCRIPTION OF THE PREFERRED EMBODIMENT

The present provides for detection of leaks and location of the leaks in pressure vessels, such, as but not limited to a spacecraft. Although spacecraft are referred to throughout the specification, it is to be understood that spacecraft are being used merely as one example of a pressure vessel for which detection and location determination of leaks is desired. The present invention is not to be limited to this specific use.

The present invention recognizes that, in the case of a space craft, listening inside the cabin to locate a leak is ineffective. The present invention provides for listening to structure borne ultrasonic noise in the skin of the spacecraft. If a leak is present, turbulence in the leaking air will generate noise in the plate and in the air. Leak noise which couples to the plate-like skin of the spacecraft is carried away from the leak site as guided ultrasonic Lamb waves. By monitoring and analyzing these waves propagating within the skin of the spacecraft, leaks are identified and located.

Figure 1:
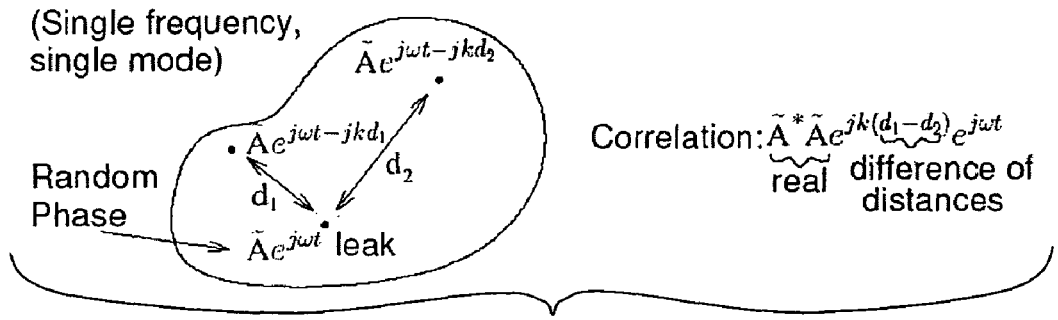
FIG. 1 is a diagram illustrating how a correlation operation transforms random noise waveforms into predictable function of the leak spectrum, leak location, and detector geometry.

The present invention provides for various methods to be used for leak detection. These methods relay on using multiple sensors to sense random structure borne noise waveforms in the skin of a vessel and then applying the mathematical operation of cross correlation to compensate for the random nature of leak noise. FIG. 1 illustrates a single-frequency leak noise signal $\tilde{A}e^{j\alpha x}$ propagating in a single plate-wave mode to sensors at distance d1 and d2 gives a cross-correlation that depends primarily on the difference in propagation lengths d1-d2. In short, cross correlation transforms a pair of measured leak noise waveforms into a reproducible function of the leak noise spectrum, geometry, and elastic coupling. Even in the more complicated case of multimode propagation and dispersion (modal velocities that vary with frequency), the cross correlation remains a reproducible function of the leak noise and sensor parameters.

A more detailed mathematical description of various embodiments is provided below. These include a coupled two-dimensional phased array embodiment, a two-dimensional phased array embodiment (uncoupled, a distributed sensor embodiment, and a two rotatable sensor embodiment. After disclosure of these particular embodiments, there is a separate discussion regarding one of the two-dimensional phased array embodiment which is particularly advantageous in many circumstances. Then there is a discussion regarding a particular sensor system of the present invention.

1. LEAK DETECTION METHODOLOGIES

The noise from the leak is inherently random. Moreover, it is so faint that it is often buried 20 dB or more under other noise sources. Therefore, instead of analyzing recorded waveforms directly, the statistics of the noise are considered. In particular, we want to measure how sound waves detected by one sensor relate to sound waves detected by one or more additional sensors because this approach yields information about how the wave propagated to those sensors and hence the location of the noise source (the leak itself). One example of a preferred statistical tool to do so is the cross-correlation function, $$XCORR(x(t),y(t)) = \int_{-\infty}^{\infty} x(\tau)y(\tau-t)d\tau \quad (1)$$

The cross correlation at time t of two functions x(t) and y(t) is the inner product of x with y delayed by t, as given in Eq. 1. Cross correlation is widely used industrially on leak noise generated guided mode waveforms to locate leaks in underground pipelines. Cross correlation transforms a pair of arbitrarily long noise waveforms captured simultaneously at different sensors into a composite waveform that represents the difference in propagation between the leak and each of the two sensors. Moreover, the cross-correlation is repeatable and predictable (ignoring variations from transducer coupling effects), and recording a full set of all possible cross-correlations (including autocorrelations) between sensors captures all possible useful information from those sensors about the leak. Cross-correlation also compresses extremely long measured noise waveforms into much shorter waveforms for processing and storage, and transforms very long measured noise waveforms with low SNR into shorter high-SNR correlations without loss of useful information.

Consider a single frequency of leak-generated noise in an infinite plate. Assume the measurable amplitude of the noise in guided mode i is $|\tilde{A}_i|$ and its random phase is represented by the complex phase of $\tilde{A}_i$, which will generally be the same for the different modes. The noise in mode i at the location of the leak is $$\tilde{A}_i \exp(j2\pi ft). \quad (2)$$

The waveform that would be measured at a distance $d_1$ from the leak is $$\sum_i \tilde{A}_i \alpha_i \exp(j2\pi ft - jk_i d_i), \quad (3)$$

where $k_i$ represents the frequency-dependent wavenumber of mode i and $\alpha_i$ represents combine the distance- and frequency-dependent attenuative effect of geometric diffraction, material absorption, and radiative loss (into the air). The cross-correlation between waveforms at distances $d_1$ and $d_2$ is $$\sum_{i,l} |\tilde{A}||\tilde{A}|\alpha_i(d_1)\alpha_l(d_2)\exp(jk_i d_1 - jk_l d_2 + j2\pi ft), \quad (4)$$

or ignoring the i≠l cross terms, $$\sum_i |\tilde{A}|^2 \alpha_i(d_1)\alpha_i(d_2)\exp[jk_i(d_1 - d_2) + j2\pi ft] \quad (5)$$

The correlated noise is no longer random; the cross-correlation does not depend on the random phase of $\tilde{A}_i$, but only on its magnitude. From the point of view of waveform analysis the loss factors $\alpha_i(d_1)$ and $\alpha_i(d_2)$ are irrelevant because they vary slowly with frequency and hence affect only the broad spectrum of the waveform, but not its shape. When we ignore the loss terms and cross terms (or assume single mode propagation) the cross-correlation becomes a spatial function only of the difference in path lengths $d_1$-$d_2$, $$\sum_i |\tilde{A}_i|^2 \exp[jk_i(d_1 - d_2) + j2\pi ft]. \quad (6)$$

A propagating wave packet that arrives at both sensors simultaneously correlates at t=0, whereas a wave packet that arrives at one sensor 10 μs before the other correlates at either t=10 μs or t=−10 μs depending upon which sensor the wave packet passed first. This dependence on the difference in distances can be counterintuitive. Because only the difference of distances is significant, sound need not come from the same location to correlate at the same time. A particular time in the cross correlation maps through the modal wavespeed to a particular difference of distances. Geometrically, that difference of distances occurs along a hyperbole that has its foci at the sensor locations, so an observed arrival at that time could have come from any location on the hyperbola.

Successful source location is entirely dependent upon the leak noise being localized to a particular region of the plate by attenuation, edge absorption, and other losses. In a low-loss environment, reflected waves will interfere with direct waves, complicating the process of source location. In the extreme case of very low attenuation, resonance or a diffuse sound field can occur, and source location will become impossible because the cross-correlations will measure nothing but the resonance pattern and the Green's function between the sensors. Since loss is in general a strong function of frequency, only a limited frequency range will contain useful information about the location of the leak. For our tests, we used frequencies between 200-600 kHz. Source location in small objects requires higher frequency measurement and analysis to ensure sound field localization than source location in large objects, so lower frequencies may be more useful for actual spacecraft than in the smaller test configuration. Of course, the present invention is not to be limited to the preferred frequency range used for testing.

Between 200 and 600 kHz and for the 4.76-mm plate thickness there are two detectible Lamb modes; the lowest order symmetric $S_0$ compressional mode and the lowest order asymmetric $A_0$ flexural mode. These two modes are both dispersive, in that their phase velocity depends on frequency. Their dispersion is reflected in the implicit frequency dependence of the wavenumber k in Eqs. 4-6. The dispersion relations $k_{A0}(f)$ and $k_{S0}(f)$ of the $A_0$ and $S_0$ Lamb modes can be readily calculated from the known material properties, thickness and Lamb wave theory. The modes give rise to a total of four terms in Eq. 4, two single-mode terms plus two-cross-terms. Therefore, the measured correlations will contain dispersed signals from the single mode terms with interference from the cross terms. Measured correlations tend to have distinct arrivals near t=0 or less distinct dispersed wavetrains at t>0 or t<0 depending on the magnitude and sign of the difference of distances $d_1$-$d_2$.

Cross correlation greatly reduces the amount of information that must be stored. Cross correlations are limited in time from the total distances involved and the speed of propagation, so they are inherently compact, yet they can represent data from arbitrarily long measured waveforms, since the integral in Eq. 1 goes out to infinity. Moreover, a full set of all possible auto correlations (cross correlation of a waveform with itself) and cross correlations between waveforms from a set of sensors is complete in the mathematical sense that it contains all possible useful information that could be extracted from the sensors. Therefore, storing and analyzing cross correlations is an effective and efficient alternative to storing and analyzing the raw noise waveforms themselves.

We show by construction that noise waveforms equivalent to the originals can be calculated from the full set of auto and cross correlations, and therefore that there is no information loss from storing and processing only the correlations. Let x(t), y(t) be measured waveforms from a pair of sensors, and X(f), Y(f) be their Fourier transforms. Since cross correlation in the time domain is equivalent to multiplication by the complex conjugate in the frequency domain, the cross- and auto-correlations are XCORR(x,y)=X(f)Y*(f), XCORR(x, x)= X(f)X*(f), and XCORR(y,y)=Y(f)Y*(f). These correlations can be measured to arbitrarily high signal-to-noise ratios by calculating them from sufficiently long recorded waveforms. First we reconstruct a frequency domain waveform $X_r(f)$ from the known amplitude spectrum $\sqrt{X(f)X^*(f)}$ and a single random function $\phi(f)$ giving random phase $e^{i\phi(f)}$. The inverse Fourier transform of $X_r(f)$ is the reconstructed noise waveform $x_r(t)$. The reconstructed noise waveform $Y_r(t)$ is the unique inverse Fourier transform of $Y_r(f)=[X(f)Y^*(f)/X_r(f)]$ Since the reconstruction is unique given $\phi(f)$, which is equivalent to (but different from) the random phase of the leak, the reconstructed waveforms are equivalent to the originals and there is no information loss in storing and processing only the correlations.

1.1 Coupled Two-Dimensional Phased Arrays

Having now explained the statistical analysis, an embodiment is now described for coupled two-dimensional phased arrays. We have collected an all-encompassing data set to represent what could be measured if time and complexity were irrelevant. The data set contains all of the possible cross correlations between elements of two 2-dimensional phased arrays. Specialization of this data set was used to prototype the sparse methods described later herein.

An automated motion control system was used to position a pair of 1.5-mm diameter piezoelectric transducers used as sensors. Computer controlled stepping in 2 mm steps of each sensor over its own 32 mm×32 mm grid simulates two phased arrays on the 4.76-mm thick aluminum plate. These phased arrays have been coupled by measuring correlations between signals from all possible pairs of locations in the two arrays. One-second long waveforms have been recorded at 5 MSPS for each pair of sensor locations. Cross-correlations are calculated from the recorded waveforms and stored. All possible cross correlations between the 256 sensor positions in each array are recorded, leading to a total of 65536 correlations arranged as a (16×16)×(16×16) phased array calculated from 655 billion samples.

The processing of this data to reveal the leak location proceeds by straightforward Fourier phased-array analysis, followed by the application of a-priori knowledge to reduce the dimensionality of the data from five dimensions to two. The raw correlation data $D(t, x_1, y_1, x_2, y_2)$ is discretely indexed along five dimensions: time, $x_1$, $y_1$, $x_2$, $y_2$. A five-dimensional discrete Fourier transform converts the data to frequency-wavenumber space, $D(f, k_{x1}, k_{y1}, k_{x2}, k_{y2})$. The transformed data set is then converted to polar coordinates, $D(f, |k_1|, \phi_1, |k_2|, \phi_2)$. One dimension can be eliminated from the data, along with the cross terms of Eq. 4 by requiring the wavenumber magnitudes $|k_1|$ and $|k_2|$ to be equal at the two sensors, and discarding all data not on the hyperplane $|k_1|=|k_2|$. The data can also be reduced in dimension by exploiting knowledge of the dispersion relation of the $A_0$ and $S_0$ modes, $k_{A0}(f)$ and $k_{S0}(f)$, to eliminate data not on the hyperplanes $|k|=k_{A0}(f)$ or $|k|=k_{S0}(f)$. The result of this reduction is a pair of three-dimensional data sets—one for $A_0$, one for $S_0$—each a function of f, $\theta_1$, $\theta_2$. One more dimension can be eliminated by integrating the energy (square of the complex magnitude) of the data over frequency f, for example $$D_{A0}(\theta_1, \theta_2) = \int_f |D(f, |k_1|, \theta_1, |k_2|, \theta_2)|_{|k_1|=|k_2|=k_{A0}(f)}|^2 df \quad (7)$$

for the $A_0$ model This leaves a pair (one for each mode) of two dimensional functions of $\theta_1$ and $\theta_2$ that represent the modal energy from a common source incident on array 1 at angle $\theta_1$ and on array 2 at angle $\theta_2$.

The $A_0$ and $S_0$ mode Eq. 7 energy integrals are then plotted. The results indicated that the location of the leak is independent of the mode selected for analysis. In an example, the estimated leak location is less than 2 mm from the actual location. This embodiment, all though exhaustive in scope and impractical in terms of time and equipment demonstrates the capability to estimate the leak location accurately using random-signal guided waves. The coupled phased array method is particularly insensitive to interference and noise because only a tiny fraction of interference and noise are on the extracted hyperplanes; most interference and noise is distributed elsewhere in the five-dimensional space and is therefore suppressed.

In summary, the phased array embodiment previously described uses two or more dense arrays of sensors. Correlation of one sensor with an entire array is measured. A spatial FFT analysis is performed. The method provides a direction to the source. The method works in spite of dispersion, multimode propagation, echoes, etc. However, the amount of data to be collected and analyzed makes this embodiment not as practical as other embodiments described later herein.

1.2 Two-Dimensional Phased Array

One strategy for reducing the quantity of data required is to reduce the coupled $(x_1, y_1, x_2, y_2)$ array measurement described above to a pair of independent, two-dimensional array measurements: $(x_1, y_1)$ and $(x_2, y_2)$. For each array measurement, one sensor is fixed and the other is scanned across the 16×16 array. The number of correlations required for this measurement is (16×16)+(16×16)=512, a factor of 128 reduction in data from the 65536 correlation full treatment. The three-dimensional (time, x, y) Fourier transform of the data from one sensor array gives a mapping of the directions of sound propagation in the vicinity of that array in terms of frequency and horizontal and vertical wave numbers. The three-dimensional transform given measured array waveforms D(t,x,y) is:

$$D(f, k_x, k_y) = \int_x \int_y \int D(t, x, y) \exp(-ik_x x - ik_y y - i2\pi f t) df\, dy\, dx \quad (8)$$

To display this as a two dimensional image, we integrate the magnitude over our selected frequency range $$D(k_x, k_y) = \int_{f1}^{f2} |D(f, k_x, k_y)|^2 df \quad (9)$$

to obtain the distribution of energy in wavenumber $(k_x, k_y)$ space.

The bulk of the energy in wavenumber space will be on a line emanating from the origin. The direction of this line is the direction to the leak, and the leak location can be therefore found by triangulation from two or more sensor assembly locations. The effect of decoupling the two arrays is that instead of correlating a specific mode coring one array in one direction with the same mode crossing the other array in another direction, we can see only the angular energy distribution at each array. No longer is there any guarantee that the waves seen at one array match those at the other. In order to triangulate we have to assume the same waves are crossing both arrays, and, for example, in the unlikely event of multiple leaks, that assumption might be false.

Because the required data for the two-dimensional phased array measurement is a subset of that required for the coupled measurement, instead of performing a separate experiment, we can reprocess the data from the coupled experiment using only the required subset. We arbitrarily select one sensor position in sensor array #2 and extract the correlations with all possible sensor positions in sensor array #1 to obtain two-dimensional phased array data from sensor array #1 $D_1(t, x, y)$. Likewise, we select an arbitrary sensor position in array #1 and extract the correlations with array #2 to obtain phased array data for sensor array #2 $D_2(t,x,y)$. The data is processed using equations 8 and 9. After processing the two dimensional phased array data, the rays radiating from the origin indicate the measured $\theta$, and $\theta_2$ directions of −8 degrees and 225 degrees, respectively. Triangulation using these directions haves an estimated leak location 2.4 mm from the actual position on a 610×610 mm plate. The leak location estimate of this method is nearly as accurate as the coupled measurement. Interference and noise is higher than in the coupled case, in part because it has been constructed from far fewer data.

This method has the advantage that it requires far less information to find the leak location. It takes less acquisition time and less equipment than the full coupled measurement. Like the full algorithm, multimode propagation and dispersion will not create interference. Unlike the coupled method, this method treats each array independently. It finds the angular distribution of wave propagation independently under each array and triangulates from the apparently dominant direction. This two-dimensional phased array method provides a simple, robust method for locating leaks that requires far less data to be collected than the coupled phase array.

1.3 Distributed Discrete Sensor Method

While the two-dimensional phased array method requires far fewer correlations—and hence far less computation—than the four-dimensional method, it still requires two array sensors and hundreds of correlations. Using tiny subsets of the original coupled data set, we have developed an algorithm that locates the leak using only correlations between signals from a few isolated point sensors. This algorithm compares the measured correlations from a few arbitrarily distributed sensors with synthetic correlations calculated from all possible leak locations and identifies the closest match as the location of the leak.

The method for locating the leak from the measured correlations has the following steps:

1. Distribute a small number (four in our example) of sensors around a plate containing a leak, with known sensor locations $(x_1, y_1) \ldots (x_4, y_4)$.

2. Simultaneously record waveforms at all sensors $h_i(t)$, i=1 ... 4.

3. Measure all (six) possible cross correlations $$R_{il}(t) = \int_\tau h_i(\tau) h_l(\tau - t) d\tau$$

between noise waveforms from the four sensors, $R_{12}(t)$, $R_{13}(t)$ $R_{14}(t)$, $R_{23}(t)$, $R_{34}(t)$.

4. Calculate dispersion relations $k_{A0}(f)$ and $k_{S0}(f)$ for the two fundamental Lamb modes given the known thickness and material properties.

5. Select one mode, $A_0$ or $S_0$.

6. Select one measured correlation R.

7. Selection an arbitrary candidate leak location $(x_c, y_c)$.

8. Calculate a synthetic correlation $R_s$ from Eq. 6, ignoring the loss factor $\alpha$, assuming the leak is at the candidate leak location, assuming that only the selected mode is present, and assuming a flat frequency response over the selected frequency band.

9. Calculate the inner product between the synthetic and measured correlations ∫R(t)R$_s$(t)dt.

10. Repeat steps 7 through 9 for all candidate leak locations, generating a spatial mapping of the magnitude of the inner product.

11. Return to step 6 through step 10, multiplying the inner-product magnitude for all the measured correlations to create a composite mapping of leak intensity for the mode selected in step 5.

12. Return to step 5, select another mode and repeat all calculation through step 11, until all applicable modes have been accounted for. Sum the composite mappings to create an overall multi-mode map of leak intensity.

The strongest peak in the overall multi-mode intensity map provides an estimate of the leak location.

Because the algorithm processes the different modes independently, it is sensitive to both interference between the modes and interference from cross-terms. For example, a correlation signal from an $A_0$ wave mode but interpreted in the $S_0$ iteration could, when combined with interference in other correlations, generate a false peak in the $S_0$ map. To test the robustness of our procedure and to quantify the effect of this sort of interference, we have run a set of simulations with synthetic correlations assuming equal magnitudes of the $A_0$ and $S_0$ modes. These simulations are worst-case in the sense that equal $A_0$ and $S_0$ magnitudes give the highest possible relative amplitude of the cross terms. We performed 32 simulation runs, each with a different, randomly selected, pattern of sensors. The average level of the cross-interference peak relative to the peak at the leak location is −5 dB. The largest interference peak observed is 4 dB stronger than the peak at the leak location in the overall map. Under worst-case circumstances with synthetic data, inter-mode interference can generate spurious peaks equal to, or larger than, the peak at the leak location. Nevertheless, in each of these cases the leak location is also predicted by means of a secondary peak. Since the interference is a function of the sensor layout pattern, careful placement can minimize the interference effects. Adding sensors beyond the four probes assumed here will also tend to reduce interference. Experimental results from several sensor configurations with four probes found the actual location of the leak in a 610×610 mm plate with a mean error of 10.4 mm. The arbitrarily distributed sensor method permits accurate, rapid leak location with a minimum of pre-positioned equipment in an on-orbit spacecraft environment.

1.3 Two Rotatable Sensor Method

Another sparse-detector method uses two rotatable sensors. This method is appropriate for cases where a portion of the inner surface of the spacecraft pressure vessel is directly accessible to astronauts, and is suitable for smaller leaks for which the inherent delay involved in a manual measurement will not be a hazard. By rotating a pair of sensors around a central point, correlation data can be collected that can be processed by a differential phase analysis or a circular synthetic aperture analysis to determine the direction of sound wave propagation. As in the phased array methods, triangulation from two or more measurement positions will locate the leak.

At each of two or more locations, a pair of rotatable sensors is held at a fixed separation and correlations are recorded as the sensor assembly is rotated in 15 degree increments. The direction to the leak is found by examining the phase of the Fourier transform of these correlations as a function of angle.

Assuming a single mode incident at angle θ on the sensor pair rotated to angle φ, the correlation of the signals from the two sensors (separation d) will be $$|\tilde{A}|^2 \exp[j2\pi ft - jkd\cos(\theta - \phi)]. \quad (10)$$

The phase of the Fourier transform of the correlation is −j2πft−jkd cos(θ−φ). The phase varies sinusoidally as the sensor assembly is rotated, with the zeroes of the sinusoid occurring when the line connecting the sensors is parallel to the propagating wavefronts. The extrema of the phase occur when that line is perpendicular to the propagating wavefronts.

$$P(f) = \sum_\theta angle^{(unwrapped)}(D(f, \theta))e^{j\theta} \quad (11)$$

In order for the phase variation to be a meaningful measured of leak direction, there must be a single dominant mode propagating at each frequency, because multiple modes propagating together will cause phase interference. In this case, the data indicate that the compressional ($S_0$) mode dominates from 450-540 kHz, that the flexural ($A_0$) mode dominates from 280-375 kHz, and that other ranges, showing large rapid fluctuations, exhibit interference between the modes. Once a frequency range has been selected the angle to the leak can be estimated by calculating the median phase over the selected frequency range of P(f) from Eq. 11, $$\underset{f}{median}^{[angle(P(f))]} \quad (12)$$

Angles calculated with Eq. 12 are then triangulated from two or more measurement locations to precisely locate the leak.

Another way to analyze these data is as a circular synthetic aperture. Unlike the rectangular synthetic aperture (phased array) analysis described earlier, the basis functions of the circular synthetic aperture are non-orthogonal. Therefore calculating the angular spectrum from the circular array data is an ill-posed inversion problem. To accomplish the inversion we use below a modified Lanczos matrix pseudoinverse, similar to that discussed by Jackson [14].

If a sound wave is incident upon the circular synthetic aperture location at angle φ and the sensor assembly, with element separation d, is rotated to direction θ, then the expected correlation (from the simplified correlation of Eq. 6) would be:

$$\sum_i |\tilde{A}_i|^2 \exp[j2\pi ft - jk_i d\cos(\theta - \phi)] \quad (13)$$

where the sum is over the mode index i. In the synthetic aperture analysis we assume incident waves in every possible direction and then solve for the amplitudes of those waves given the measured correlations. Let $\tilde{A}_{mi}$ be the amplitude and phase of the incident wave propagating in the direction $\phi_m$ in mode i. The measured cross correlations with the sensor assembly at angle $\theta_l$ would be:

$$XCORR_l = \sum_m \sum_i |\tilde{A}_{mi}|^2 \exp(j2\pi t - jk_i d\cos(\theta_l - \phi_m)) \quad (14)$$

To solve the synthetic aperture problem, we must solve for the angular and modal amplitude spectra $|\tilde{A}_{mi}|$ given the measured cross-correlations. Eq. 14 can be represented as a matrix $E_{lq} \equiv \lfloor D_{lmA_0} D_{lmS_0} \rfloor$ and a vector $$C_q \equiv \begin{bmatrix} |\tilde{A}_{mA_0}|^2 \\ |\tilde{A}_{mS_0}|^2 \end{bmatrix}$$

such that Eq. 14 reduces to the matrix equation $$XCORR_l = E_{lq} C_q \exp(j2\pi ft). \quad (15)$$

Equation 15 represents the prediction of correlations from a known angular and modal spectrum $C_q$ as a matrix multiplication. Inversion of this equation allows estimation of the angular distribution of incident waves from the measured data. In a linear synthetic aperture problem, $E_{lq}$ is a spatial Fourier transform and is easily inverted. In the current case of a circular synthetic aperture, depending on the number of chosen values for $\phi_m$ and $\theta_l$, this matrix is ill-conditioned and may not be square. To construct the pseudoinverse $E_{lq}^{inv}$, we first calculate the singular value decomposition of E, $E = USV^t$, where U and V are unitary and S is diagonal, with its elements $S_{ii}$, the singular values. Let the largest singular value be $S_{max}$. The pseudoinverse is $E^{inv} = VS^{inv}U^t$, where $S^{inv}$ is diagonal and constructed from the elements of S, $$S_{ii}^{inv} = \frac{1}{S_{ii}} e^{-0.2\left(\frac{S_{max}}{S_{ii}} - 1\right)} \text{ (no sum)} \quad (16)$$

Since E is ill-conditioned, it likely has very small singular values. When inverted, these small singular values become very large and potentially scale any error or noise in the measured correlations. The exponential factor in Eq. 16 limits the noise gain of the inversion process by scaling down the inverses of the smallest singular values, following the concept of singular value truncation discussed in Jackson [14]. The arbitrary factor of 0.2 selects the rate of scaling and corresponds to the reduction of the inverse of a singular value with half the magnitude of the largest singular value.

The estimated angular and modal distribution can be calculated from $E_{lq}^{inv}$ according to $$\begin{bmatrix} |\tilde{A}_{mA_0}|^2 \\ |\tilde{A}_{mA_0}|^2 \end{bmatrix} \equiv C_q = \sum_l E_{ql}^{inv} XCORR_l e^{-j2\pi ft} \quad (17)$$

Equation 17 gives the synthetic aperture calculation for estimating the incident angular and modal distribution $|\hat{A}_{mi}|^2$ from a single frequency component (at frequency f) of a set of measured correlations $XCORR_l$. By iterating this calculation over our frequency range, we obtain the estimated angular distribution as a function of frequency and mode. Integrating this distribution over frequency, $$\int_{f_1}^{f_2} |\hat{A}_{mi}|^2 df \quad (18)$$

will yield a peak in the integral in the dominant direction. This peak gives an estimate of the direction to the source.

A two-sensor leak location by triangulation was performed from three measurement positions with both analysis methods. The source location error in this case was 2.0 mm for the phase comparison method and 2.3 mm for the circular synthetic aperture method. As before, this source location was accomplished in a 610 mm square 4.76 mm thick aluminum plate with a 1-mm diameter leak. The two sensor method is a viable method for locating leaks. It has the disadvantages of requiring manual operation and high sensitivity to cross-mode interference, yet it requires a minimum of equipment. The equipment need not be manufactured as part of the spacecraft.

Each of these methods developed and demonstrated here can successfully and repeatably locate air leaks into vacuum using structure-borne noise. Of the four methods presented, only the first method, the four dimensional phased array is impractical because of the extreme amount of data that must be collected. Each of the other methods is a viable alternative depending on the circumstances involved. A more detailed example of the two-dimensional phased array is discussed later herein including in conjunction with a miniature array transducer with high speed correlator electronics. With a scattering of two-dimensional arrays on the inside of a spacecraft module, this method would instantly identify the location of the leak while rejecting possible interference. The distributed discrete sensor method would provide the same result, but with greater vulnerability to interference and false peaks, yet with substantially smaller hardware and computation requirements. The two-sensor method would be appropriate for the more spartan spacecraft environment in which the outer pressure walls are accessible from the inside and for which the weight of a permanently embedded monitoring system would be prohibitive.

2. LEAK DETECTION USING TWO-DIMENSIONAL PHASED ARRAY

The concept of two-dimensional phased arrays has already been discussed. In this particular embodiment of a two-dimensional phased array, a sophisticated signal-processing algorithm is used to determine a leak location. The algorithm accounts for the multi-mode dispersive characteristics in a plate-like structure, and utilizes structure-borne noise generated by turbulence at an air leak. In order to reduce the amount of data required and computation efforts, the proposed algorithm determines only the propagation direction of an air leak, rather than time-of-flight information. When an air leak and sensors are positioned in a line, the time-of-flight information is easily determined by simplifying the computational steps in the proposed algorithm. Both cases of determining either propagation direction or time-of-flight information are presented in this section. We also show the performance of the proposed algorithm, using cross-correlated signals on a two-dimensional grid at pairs of sensor locations.

2.1 Mathematical Descriptions of the Signal Processing Algorithm

Figure 2:
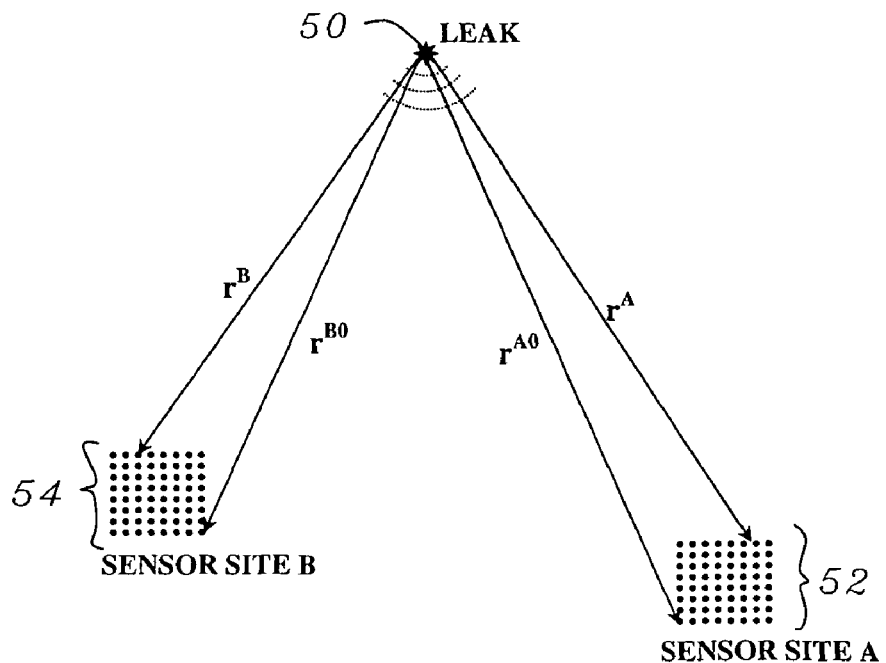
FIG. 2 is a schematic of leak and randomly distributed sensor arrangement.
Figure 3:
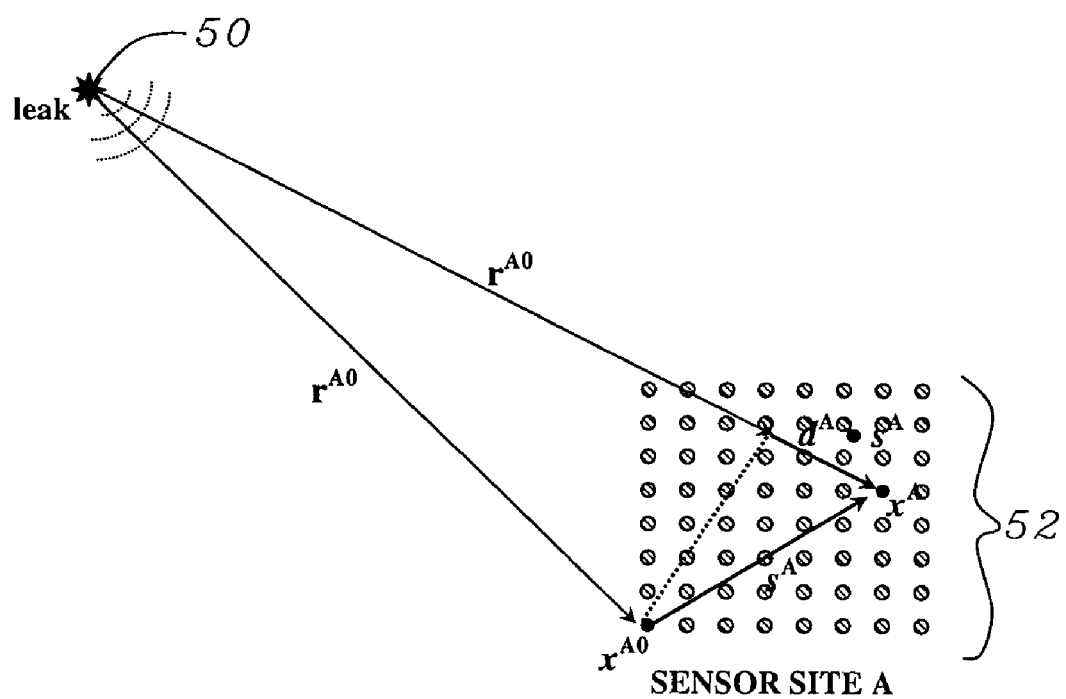
FIG. 3 is a diagram of the mathematical vector notations at sensor site A.

The proposed signal-processing algorithm is designed to isolate particular modes of propagation within the received signals at two sensor sites. To investigate dispersive propagation in a plate-like structure, we assume that an air leak source and sensors are randomly positioned. For convenience, we use the terms "sensor site" and "sensor" interchangeably. For example, sensor 'A' means that the sensor is located in a sensor site 'A'. It is assumed that the sensor site is a 2-dimensional square grid, such as 16×16 or 8×8 array. FIG. 2 illustrates a schematic of a leak and randomly distributed sensor arrangement. A leak 50 is shown as well as a first sensor site 52 and a second sensor site 54. FIG. 3 provides mathematical vector notations at the first sensor site.

First, consider a single frequency w of structure-borne noise generated by turbulence at an air leak that has coupled into a particular mode of propagation in a plate-like structure. Assuming that the sensor is sufficiently far from the leak, the geometric dependence of the received voltage signal at the sensor A is proportional to $r^{-1/2}$. An appropriate mathematical expression for the received voltage signal at a sensor 'A' for a single dispersive mode i is:

$$V^A(r,\omega) = N(\omega)(r^A \exp(jk_A^i(\omega)r^A) \quad (2.1)$$

where $N(\omega)$ is the temporal frequency response of the leak, $k_A^i(\omega)$ is the frequency dependent wave number, and/is the distance from the leak to the sensor 'A'. The term, $A_i(\omega)$, represents the amplitude of the coupling of the leak and sensor into a particular mode types i (symmetric or antisymmetric), and the sensitivity of the sensor to the displacements generated by that mode as the structure-borne noise passes beneath the sensor. It is assumed that the coupling into the mode is uniform with respect to direction. Since the structure-borne noise shows multiple dispersive modes in a plate-like structure [20-24], the complete mathematical model for Equation 2.1 at a single frequency w is the sum of n modes of propagation as shown in Equation 2.2 below.

$$V^A(r^A, \omega) = N(\omega)(r^A)^{-1/2} \sum_n A_n(\omega)\exp(jk_A^n(\omega)r^A(\omega)). \quad (2.2)$$

Similarly, the mathematical expression for the output voltage signal at a sensor B is $$V^B(r^B, \omega) = N(\omega)(r^B)^{-1/2} \sum_m B_m(\omega)\exp(j(k_B^m(\omega)r^B) \quad (2.3)$$

where $N(\omega)$ is the temporal frequency response of the leak, $k_B^m(\omega)$ is the frequency dependent wave number, and $r^B$ is the distance from the leak to the sensor 'B'. The term, $B_m(\omega)$, represents the amplitude of the coupling of the leak and sensor into a particular mode m, and the sensitivity of the sensor to the displacements generated by that mode as the structure-borne noise passes beneath the sensor.

Again, assuming the distance between a leak and sensor is sufficiently large, we can consider that a measured wave front within a neighborhood of a sensor position at sensor site is linear. The distance from a leak to sensor 'A' can be expressed as $$r^A \approx r^{A0} + d^A \cdot (x^A - x^{A0}) \quad (2.4)$$
$$= r^{A0} + d^A \cdot s^A$$

where $r^{A0}$ is the distance from a reference sensor position $x^{A0}$ at sensor site 'A' to the leak, $d^A$ is a directional unit vector of propagation, $x^A$ is the distance from an arbitrary sensor position at the sensor site 'A' to the leak, and $s^A$ is a vector connecting the reference position and the arbitrary sensor position at the sensor site 'A'. Similarly, the distance from a leak to sensor 'B' can be expressed $$r^B \approx r^{B0} + d^B \cdot (x^B - x^{B0}) \quad (2.5)$$
$$= r^{B0} + d^B \cdot s^B.$$

Substituting Equation 2.4 into Equation 2.2, the output voltage signal at sensor 'A' is expressed as $$V^A(s^A, \omega) = N(\omega)(r^{A0} + d^A \cdot s^A)^{-1/2} \sum_n A_n(\omega)\exp(jk_A^n(\omega)(r^{A0} + d^A \cdot s^A)) \quad (2.6)$$
$$\cong N(\omega)(r^{A0})^{-1/2} \sum_n A_n(\omega)\exp(jk_A^n(\omega)(r^{A0} + d^A \cdot s^A)). \quad (2.7)$$

Similarly, for sensor 'B', $$V^B(s^B, \omega) = N(\omega)(r^{B0} + d^B \cdot s^B)^{-1/2} \sum_n B_m(\omega)\exp(jk_B^m(\omega)(r^{B0} + d^B \cdot s^B)) \quad (2.8)$$
$$\cong N(\omega)(r^{B0})^{-1/2} \sum_m B_m(\omega)\exp(jk_B^m(\omega)(r^{B0} + d^B \cdot s^B)) \quad (2.9)$$

In Equation 2.7 and 2.9, it is assumed that reduction of the signal amplitude owing to diffraction is negligible.

Given the expressions for the received signals at sensors 'A' and 'B', we can isolate a particular mode of propagation using a spatial window function $W(s^A)$ and $W(s^B)$. The window functions are zero outside the identified neighborhood. For example, the simplest window function has a constant non-zero value over a square area about the fixed reference point. Multiplying the spatial Fourier transformed window function by Equation 2.7, $$V^A(k^A, \omega) = \int_{-\infty}^{\infty} W(s^A) V^A(s^A, \omega) \exp(-jk^A s^A) ds^A \qquad (2.10)$$

$$= \int_{-\infty}^{\infty} W(s^A) \left[ N(\omega)(r^{A0})^{-1/2} \sum_n A_n(\omega) e^{j(k_A^n(\omega)(r^{A0}+d^A \cdot s^A))} \right] e^{-jk^A s^A} ds^A$$

$$= N(\omega)(r^{A0})^{-1/2} \sum_n A_n(\omega) \left[ \int_{-\infty}^{\infty} \left[ W(s^A) e^{j(k_A^n(\omega)(d^A \cdot s^A) - k^A s^A)} \right] ds^A \right] e^{j(k_A^n(\omega) r^{A0})}$$

where $$\int_{-\infty}^{\infty} \left[ W(s^A) e^{j(k_A^n(\omega)(d^A \cdot s^A) - k^A s^A)} \right] ds^A = \hat{W}(k^A - k_A^n(\omega) d^A) \qquad (2.11)$$

Incorporating Equation 2.11 into 2.10, $$V^A(k^A, \omega) = \qquad (2.12)$$

$$N(\omega)(r^{A0})^{-1/2} \sum_n A_n(\omega) \hat{W}(k^A - k_A^n(\omega) d^A) \exp(j k_A^n(\omega) r^{A0}).$$

When $k^A = k^p(\omega) d^A$, Equation 2.12 can be written as $$V^A(k^p(\omega) d^A, \omega) = \qquad (2.13)$$

$$N(\omega)(r^{A0})^{-1/2} \sum_n A_n(\omega) \hat{W}(k^p(\omega) d^A - k_A^n(\omega) d^A) \exp(j k_A^n(\omega) r^{A0})$$

And, if the spatial Fourier transformed window function is sufficiently wide, $$V^A(k^p(\omega) d^A, \omega) = N(\omega)(r^{A0})^{-1/2} A_p(\omega) \exp(j k^p(\omega) r^{A0}) \qquad (2.14)$$

where $$\hat{W}((k^p(\omega) - k_A^n(\omega)) d^A) \cong \begin{cases} 1, & n = p \\ 0, & n \neq p \end{cases} \qquad (2.15)$$

Equation 2.14 represents the mode isolated Fourier transformed signal measured at sensor 'A'. Similarly, for a received signal at sensor B, $$V^B(k^B, \omega) = \qquad (2.16)$$

$$N(\omega)(r^{B0})^{-1/2} \sum_m B_m(\omega) \hat{W}(k^B - k_B^m(\omega) d^B) \exp(j k_B^m(\omega) r^{B0}).$$

Assuming $k^B = k^q(\omega) d^B$, Equation 2.17 can be written as $$V^B(k^q(\omega) d^B, \omega) = \qquad (2.17)$$

$$N(\omega)(r^{B0})^{-1/2} \sum_m B_m(\omega) \hat{W}(k^q(\omega) d^B - k_B^m(\omega) d^B) \exp(j k_B^m(\omega) r^{B0})$$

If the Fourier transformed window function is sufficiently wide, $$V^B(k^q(\omega)) d^B, \omega) = N(\omega (r^{B0})^{-1/2} A_q(\omega) \exp(j k^q(\omega) r^{B0}) \qquad (2.18)$$

where $$\hat{W}((k^q(\omega) - k_B^m(\omega)) d^B) \cong \begin{cases} 1, & m = q \\ 0, & m \neq q \end{cases} \qquad (2.19)$$

Equation 2.18 represents the mode isolated Fourier transformed signal measured at sensor 'B'.

Since the temporal frequency response of the leak source, $N(\omega)$, is a random signal, we can not directly extract useful time-of-flight information by using Equation 2.14 and 2.18 alone. Instead, assuming mode isolated cross-correlated signals are available at sensor 'A' and 'B' positions, we can take advantages of cross-correlation techniques. Given the signals at sensor position 'A' and 'B', the mean mode-isolated, cross-correlated signal at sensor A and B positions is expressed as:

$$\langle C^{AB}(k^A, k^B, \omega) \rangle = \langle V^A(k^A, \omega) V^{B*}(k^B, \omega) \rangle \qquad (2.20)$$

where $\langle \rangle$ represents the mean value of the signal in the bracket and '*' represents the complex conjugate of a Fourier transformed signal. Substituting Equation 2.12 and 2.17 into 2.20, $$\langle C^{AB}(k^A, k^B, \omega) \rangle = \qquad (2.21)$$

$$P(\omega) \frac{1}{\sqrt{r^{A0} r^{B0}}} \sum_n \sum_m A_n B_m^*(\omega) \exp(j k_A^n(\omega) r^{A0} - j k_B^m(\omega) r^{B0})$$

$$\hat{W}(k^A - k_A^n(\omega) d^A) \hat{W}^*(k^B - k_B^m(\omega) d^B)$$

where $P(\omega) = \langle N(\omega)N^*(\omega) \rangle$, and is the mean power spectra of the random, stationary noise, $N(\omega)$, generated by turbulence at an air leak. If $k^A = k_A^n(\omega)d^A$ and $k^B = k_B^m(\omega)d^B$, Equation 2.21 can be written as $$\langle C^{AB}(k_A^n d^A, k_B^m d^B, \omega) \rangle = \tag{2.22}$$
$$P(\omega) \frac{1}{\sqrt{r^{A0} r^{B0}}} A_n(\omega) B_m^*(\omega) \exp(jk_A^n(\omega)r^{A0} - jk_B^m(\omega)r^{B0}).$$

Equation 2.22 yields a 5-dimensional dispersion relation as a function of $k_{Ax}^n$, $k_{Ay}^n$, $k_{Bx}^m$, $k_{By}^m$, and $\omega$. For example, if the modes are considered to be the same in the analysis, the wave numbers are expressed as $$k_A^n(\omega) = k_B^m(\omega) = k(\omega). \tag{2.23}$$

This leads to $$\langle C^{AB}(k(\omega)d^A, k(\omega)d^B, \omega) \rangle = \tag{2.24}$$
$$P(\omega) \frac{1}{\sqrt{r^{A0} r^{B0}}} A_n(\omega) B_m^*(\omega) \exp(jk(\omega)(r^{A0} - r^{B0}))$$

This represents a mode-isolated, temporal and spatial Fourier transformed signal at sensor 'A' and 'B'. However, Equation 2.21 is driven under the assumptions that all the data are collected simultaneously from the sensor site 'A' and 'B'. In practice, this is not feasible using even current state-of-art instrumentation.

So, instead of using mathematical analysis shown in Equation 2.20-22, we can alternatively perform a 5-dimensional Fourier transforms after collecting the mean temporal convolution between pairs of sensor positions at the sites 'A' and 'B'. The mean temporal cross-correlation signals between all sensor positions at sites 'A' and 'B' is expressed as $$\langle C^{AB}(s^A, s^B, \omega) \rangle = \langle V^A(s^A, \omega) V^{B*}(s^B, \omega) \rangle = P(\omega) \tag{2.25}$$
$$\frac{1}{\sqrt{r^{A0} r^{B0}}} \sum_n \sum_m A_n(\omega) B_m^*(\omega)$$
$$\exp(jk_A^n(\omega)(r^{A0} + d^A \cdot s^A) - jk_B^m(\omega)(r^{B0} + d^B \cdot s^B))$$

Performing a windowed 5-dimensional Fourier transformation, Equation 2.25 is the same as Equation 2.22. When the modes are the same (i.e. n=m), $$k_A^n(\omega) = k_B^m(\omega) = k^n(\omega). \tag{2.26}$$

Then, the leak location is then given by $$G_n^{AB}(s, p^A, p^B) = \int \langle C^{AB}(k^n(\omega)p^A, k^n(\omega)p^B) \rangle \exp^{-jk^n(\omega)s} d\omega \tag{2.27}$$

where $p^A$ and $p^B$ represent the unit direction vectors. And s is the difference in the distance between leak and sensor for sites 'A' and 'B'. Substituting Equation 2.21 into 2.27, $$G_n^{AB}(s, p^A, p^B) = \int \langle C^{AB}(k^n(\omega)p^A, k^n(\omega)p^B) \rangle \exp^{-jk^n(\omega)s} d\omega \tag{2.28}$$
$$= \int P(\omega) \frac{1}{\sqrt{r^{A0} r^{B0}}} \sum_n \sum_m A_n(\omega) B_m^*(\omega) \exp(jk^n(\omega)$$
$$p^A \cdot r^{A0} - jk^n(\omega)p^B \cdot r^{B0}) \hat{H}(k^n(\omega)p^A, k^n(\omega)p^B, \omega)$$
$$\exp(-jk^n(\omega)s) d\omega$$

and $$\hat{H}(k^n(\omega)p^A, k^n(\omega)p^B, \omega) = \hat{W}(k^A - k^n(\omega)p^A \cdot d^A) \tag{2.29}$$
$$\hat{W}^*(k^B - k^n(\omega)p^B \cdot d^B)$$

Based on the assumptions described in Equation 2.4, 2.5, 2.15 and 2.19, Equation 2.28 vanishes if $p^A \neq d^A$ and $p^B \neq d^B$. Therefore, the unit direction vectors are $$p^A = d^A \tag{2.30}$$

and $$p^B = d^B. \tag{2.31}$$

Therefore, $p^A \cdot r^{A0} = R^{A0}$ and $p^B \cdot r^{B0} = R^{B0}$ in Equation 2.28, where $R^{A0}$ and $R^{B0}$ represent the distance from the leak to sensors 'A' and 'B' respectively. Given these conditions, Equation 2.28 can be written as $$G_n^{Ab}(s, d^A, d^B) = \tag{2.32}$$
$$P(\omega) \frac{1}{\sqrt{r^{A0} r^{B0}}} \int A_n(\omega) B_n^*(\omega) \exp(jk^n(\omega)(R^{A0} - R^{B0} - s)) d\omega$$

Equation 2.32 will assume its maximum amplitude when $s = R^{A0} - R^{B0}$. The location of the leak is then determined by obtaining the value of s, $d^A$ and $d^B$, where $G_n^{AB}(s, d^A, d^B)$ is the spectral maximum. Therefore, the leak is located in the directions of $d^A$ from the sensor site 'A' and $d^B$ from the sensor site 'B'.

2.2 Practical Application of the Signal-Processing Algorithm

In case that a leak and sensor are not positioned in a line, the process of locating a leak actually becomes much simpler because we seek only the directions of the leak, instead of extracting time-of-flight information. Once we find the directions, we simply extend the line-of-sight in the directions of $d^A$ and $d^B$ to find the location of a leak. As a result, the intersection of the lines is the estimated location of the leak. Typically, in order to utilize Equation 2.32, we need to perform a five-dimensional Fourier transformation in time and space. This process requires high computing power and a long computation time. Even though it can be performed with exceptional computing equipment, we would have to display the results in a five-dimensional domain ($k_{Ax}^n$, $k_{Ay}^n$, $k_{Bx}^m$, $k_{By}^m$ and $\omega$) afterwards. Clearly, it is not straightforward to locate a leak by examining a five-dimensional data set.

To overcome such difficulties, we can simplify the process. Consider that the mean temporal cross-correlation signals between all sensor positions at sites 'A' and 'B' can be expressed as $$\langle C^{AB}(s^A, s^B, \omega) \rangle = \langle V^A(s^A, \omega), V^B(s^B, \omega) \rangle \tag{2.33}$$

-continued $$= P(\omega)\frac{1}{\sqrt{r^{A0}r^{B0}}}\sum_n\sum_m A_n(\omega)B_m^*(\omega)\exp(jk_A^n(\omega)$$
$$(r^A + d^A \cdot s^A) - jk_B^m(\omega)(r^B + d^B \cdot s^B))$$
$$= P(\omega)\frac{1}{\sqrt{r^{A0}}}C^*(s^B, \omega)\sum_n A_n(\omega)\exp(jk_A^n(\omega)$$
$$(r^A + d^A \cdot s^A))$$

where $$C^*(s^B, \omega) = \frac{1}{\sqrt{r^{B0}}}\sum_m B_m(\omega)\exp(-jk_B^m(\omega)(r^{B0} + d^B \cdot s^B)). \quad (2.34)$$

The $C^*(s^B)$ represents the received voltage signal for multiple dispersive modes of propagation at sensor site 'B'. When a three-dimensional Fourier transformation in time and two transforms in space (x and y) are performed for only $s^A$, we obtain $$\langle C^{AB}(k^A, s^B, \omega)\rangle = \quad (2.35)$$
$$\langle V^A(k^A, \omega)V^{B*}(k^B, \omega)\rangle = P(\omega)\frac{1}{\sqrt{r^{A0}}}C^*(s^B, \omega)$$
$$\sum_n A_n(\omega)\exp(jk_A^n(\omega)r^{A0})W(k^A - k_A^n(\omega)d^A)$$

As a result, Equation 2.35 shows that the three-dimensional Fourier transformation isolates the modes of propagation only at the sensor site 'A'. However, the signal contributions from the sensor site 'B' still remain as superimposed forms on the resulting signal. The maximum spectra magnitude of Equation 2.35 in the three-dimensional domain ($k_{Ax}^n$, $k_{Ay}^n$, and $\omega$) leads to the direction of propagation $d^A$. Similarly, we can construct a three-dimensional Fourier transformation in time and space for only $s^B$, $$\langle C^{AB}(s^A, k^B, \omega)\rangle = \quad (2.36)$$
$$\langle V^A(k^A, \omega)V^{B*}(k^B, \omega)\rangle = P(\omega)\frac{1}{\sqrt{r^{B0}}}D(s^A, \omega)$$
$$\sum_m B_m^*(\omega)\exp(-jk_B^m(\omega)r^{B0})W^*(k^B - k_B^m(\omega)d^B)$$

where $$D(s^A, \omega) = \frac{1}{\sqrt{r^{A0}}}\sum_n A_n(\omega)\exp(jk_A^n(\omega)(r^{A0} + d^A \cdot s^A)) \quad (2.37)$$

The $D(s^A)$ represents the received voltage signal for multiple dispersive modes of propagation at sensor site 'A'. The maximum magnitude of Equation 2.36 leads to the direction of propagation $d^B$. Then, by extending the lines in the directions of $d^A$ and $d^B$, the intersection is found to be the location of the leak. In practice, the directions can be readily determined by examining the results of Equation 2.35 and 2.36 in the horizontal ($k_x$) and vertical ($k_y$) spatial frequency plane.

2.3 Special Case: Collinear Configuration

When a leak hole and sensors happen to occur in a line, we cannot directly use the algorithm described in Equation 2.33-2.37 to identify the direction of a leak from sensor sites. Instead, the time-of-flight information is extracted from the received signals. Extracting the time-of-flight information is readily performed by letting $d^A = -d^B$ or $d^B = -d^A$ in Equation 2.32 So, $$G_n^{AB}(s) = \quad (2.38)$$
$$P(\omega)\frac{1}{\sqrt{r^{A0}r^{B0}}}\int A_n(\omega)B_n^*(\omega)\exp(jk^n(\omega)(R^{A0} - R^{B0} - s))d\omega$$

Equation 2.38 yields a peak at $s = R^{A0} - R^{B0}$ with an amplitude equal to the integral of Equation 2.38 yields the maximum amplitude when $s = R^{A0} - R^{B0}$. The location of the leak is determined by obtaining the value of s, where $G_n^{AB}$ (s) shows the maximum spectra.

2.4 Simulation

Figure 4:
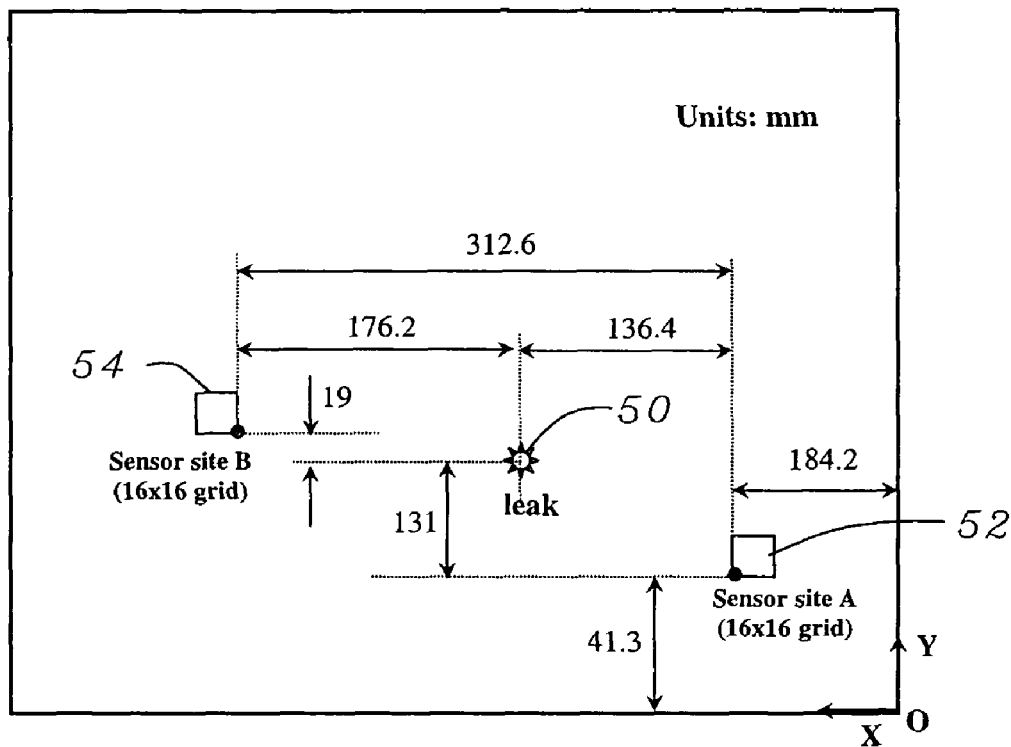
FIG. 4 is a schematic diagram of the measurement configuration. All dimensions are in millimeters.

The proposed algorithm for locating a leak is experimentally evaluated, using actual data collected from a 584 mm×609 mm×4.76 mm aluminum plate. In order to simulate atmosphere leaking from a habitable space-based environment into the vacuum of space, an air leak is introduced by drawing air through a 0.71~1.04 mm diameter stepped hole using a vacuum pump. As shown in FIG. 4, the measurements are collected at a first sensor site 52 (sensor site 'A') and a second sensor site 54 (sensor site 'B'). Each sensor site 52, 54 consists of a 16×16 square grid of measurement points with 2 mm spacing between the adjacent points, which are carefully selected to prevent from mode aliasing [22-23]. At each sensor site 52, 54, mean cross-correlated signals between a pair of transducers, one at the first sensor site 52 and the other at the second sensor site 54 are collected on the 16×16 square grid.

Once the signals are acquired, they are band-pass filtered in the frequency range of 10-500 kHz. A 1.3-mm diameter miniature transducer, called a pinducer, is used to collect the signals. Since it is far smaller than any of the sound wavelengths of interest, the pinducer is treated as a point detector.

In order to utilize the proposed algorithm, we take one position at the sensor site 'A' (or 'B') as a reference point. The mean cross correlations with signals at the 16×16 square grid points in the sensor site 'B' (or 'A'), against the reference point, are Fourier transformed in time and in two spatial dimensions (x and y). Then, the energy distribution of the measured signals is plotted in the $k_x$-$k_y$ plane over the frequency range of 200-500 kHz. In the $k_x$-$k_y$ plane, the direction to the maximum energy distribution is the direction to the source leak. Instead of utilizing the energy distribution approach, we can alternatively perform a similar data analysis using the three-dimensional spectra, one time and two spatial dimensions (x and y). In this approach, the resulting three-dimensional spectra are plotted in the $k_x$-$k_y$-$\omega$ plane. Then, a plane vertically slicing the $k_x$-$k_y$ plane is rotated with respect to the temporal frequency ($\omega$) axis until a maximum in the spectrum is observed on the slicing plane. The rotation angle of the slicing plane showing the spectral maximum is the direction to the leak. Although both approaches provide the same result, we prefer to use the first approach in the analysis, owing to its simplicity.

Figure 5:
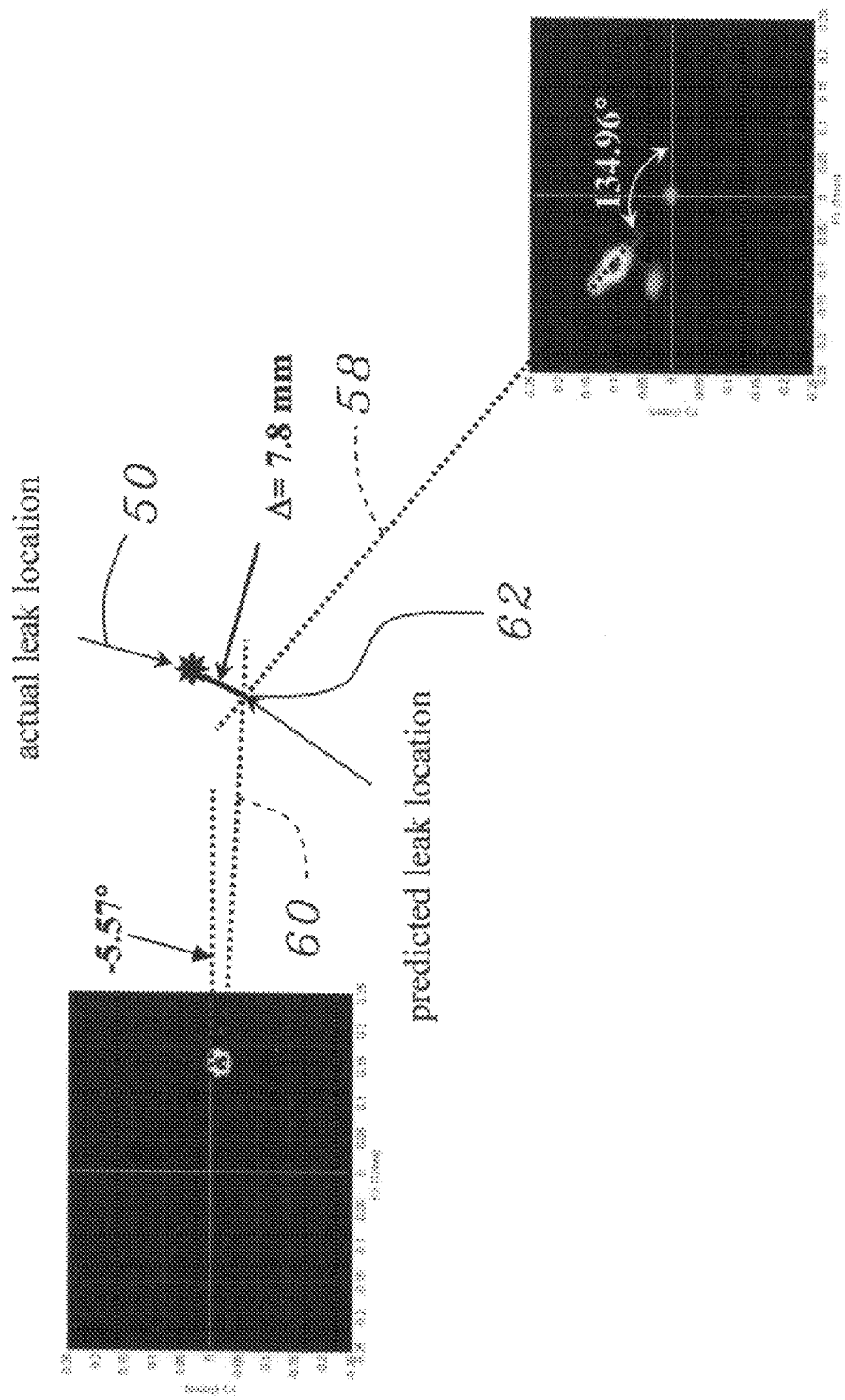
FIG. 5 is a diagram illustrating leak location using mode-isolated, 3-dimensional Fourier Transformed cross-correlated signals at sensor site 'A' and 'B.'

In order to estimate the direction to the leak at the site 'B', the cross-correlated signals are obtained at all 16×16 points at the site 'A' while a point at the site 'B' is fixed as a reference point. Then, its energy distribution is plotted in the in the $k_x$-$k_y$ plane, and an estimated direction to the leak is found to be 134.96° compared with the actual direction of 136.16°. When the same data analysis is performed on the cross-correlated signals at all 16×16 points at the site 'B' by fixing a reference point at the site 'A', an estimated direction is found to be −5.57°, compared with the actual angle of −6.15°. FIG. 5 illustrates these plots.

The variations between the estimations and actual values are within the precision of the method and small enough to be negligible in practice. Once the estimated directions are obtained at sites 'A' and 'B', we readily find the exact location of the leak by drawing lines 58, 60 toward the angles at the reference point in the sensor site 'A' or 'B'. Finally, the intersection of the lines at point 62 is the estimated location of the leak. The error or distance between the predicted leak location 62 and the actual leak location 64 is found to be 7.8 mm, which is acceptable.

According to the experimental results, it is reasonable to assume that the leak location algorithm is effective in locating a leak in a plate-like structure, when the leak is from within the vessel to a vacuum outside. In addition, the sensitive and sophisticated algorithm can pinpoint the location of a leak within an acceptable experimental uncertainty.

Utilizing the 16×16 array measurements, we determine a minimal measurement grid size needed to accurately locate a leak. The results can be, then, directly implemented in our proposed array transducer design. We have chosen the measurement grid size to be 2×2, 4×4, 8×8, and 16×16 with 2-mm point spacing. As the square grid size is increased, the indication of a leak source becomes clearer and stronger. For example, compared with the results for the 2×2 square grid size, ones for the 16×16 grid size show much stronger indications. In addition, background noise becomes much smaller as the grid size increases from 2×2 to 16×16.

When a 2×2 square grid size is employed to find a leak location, it shows two strong indications of a leak source in the $k_x$-$k_y$ plane in opposite directions. The directions to the strong indications are approximately 9.3° and 169°, which are assumed to be the estimated direction to the leak source at sensor site 'A'. We speculate that showing two indications is caused by aliasing due to undersampling. Neither of the estimated directions shows accurate direction to the location of the leak, compared with the actual direction to the leak source of −6.15°. Based on the results, using the 2×2 grid size causes under-sampling in signal processing so that it provides completely wrong indications and higher background noise. The high background noise can also increase the error in the estimate. Therefore, a square array of 2×2 elements is not useful for locating a leak, owing to the seriously reduced element count in this case.

When we employ 4×4 square array elements, the performance improves, and only one strong indication and low background noise are observed in the $k_x$-$k_y$ plane. The estimated direction is found to be approximately 0°, compared with the actual direction of −6.18°. We still observe a very weak indication of the leak source in the opposite direction, which is caused by the reflections from the plate edges. However, the indication is so weak that it can be negligible in the analysis. If we use 8×8 square array elements, the estimated direction is found to be approximately −5.38°. This result is very similar to the estimated direction of −5.57°, obtained by using 16×16 array elements.

Based on this analysis, it is reasonable to assume that an 8×8 square array with 2 mm spacing can still provide an acceptable estimate of the location of a leak. In addition, computation burden and the amount of data required are substantially reduced. For our practical device, we therefore employ an 8×8 square array of transducer elements in our proposed array transducer design.

3. DESIGN AND FABRICATION OF A PRACTICAL ARRAY SENSOR

A prototype of a two-dimensional PZT (lead zirconate titanate) array sensor has been designed and fabricated to detect structure-borne noise generated by downstream turbulence at an air leak at a remote location. The sensor is still small enough to be permanently attached to the spacecraft and has few enough elements to permit rapid data acquisition. After the signals are acquired, they are utilized in our proposed leak location algorithm to find the direction to the leak source. For the fabrication of the proposed array sensor, we have utilized common PCB (printed circuit board) fabrication techniques and standard mirco-electronic components. As a result, the overall design can be simply modified, depending on the requirements.

Figure 6:
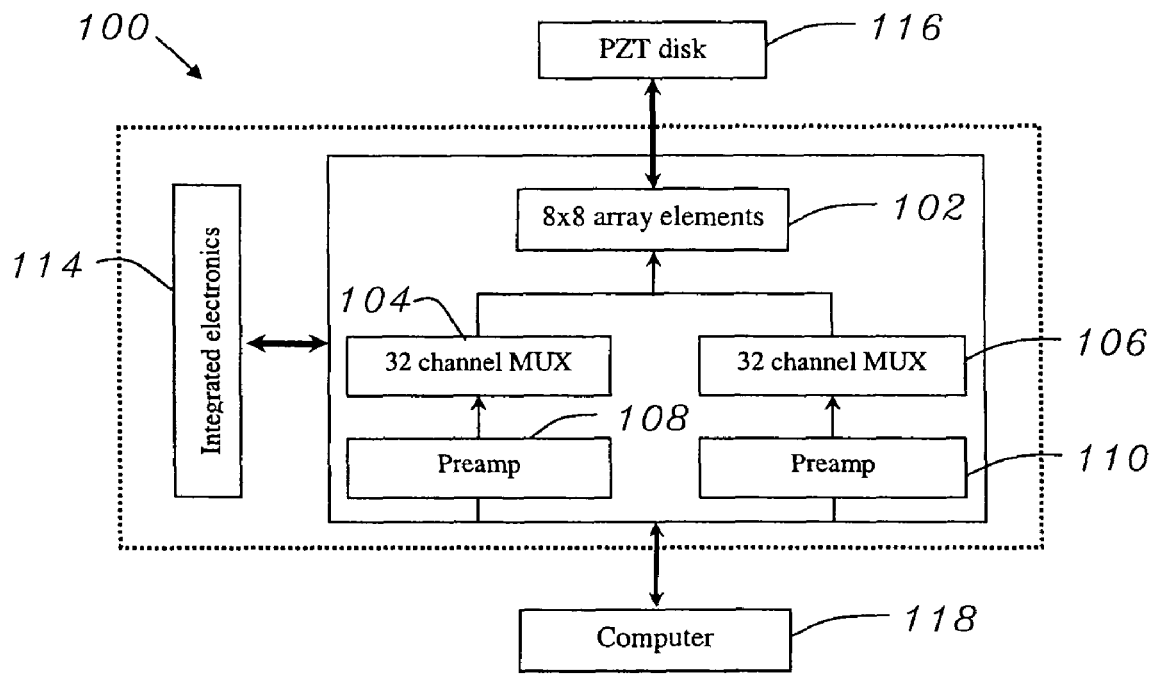
FIG. 6 is a schematic diagram of a two-dimensional Piezo array sensor system.
Figure 7:
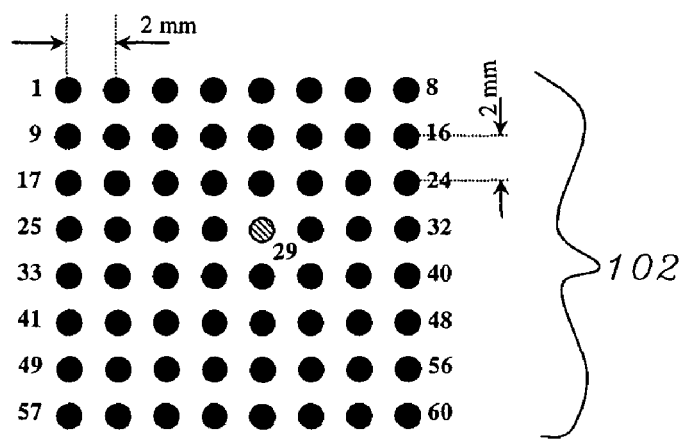
FIG. 7 is a schematic diagram of an 8×8 array with one element selected as the reference element.

The fundamental design philosophy of the array sensor is to include all active two-dimensional array elements, preamps, multiplexers, integrated electronics and mechanical components in a single unit mounted to the circuit board. FIG. 6 shows a schematic diagram of the PZT array sensor 100. To achieve satisfactory performance with both a lower computational burden and a simplified hardware design, we have exploited the experimental results obtained. We choose, therefore, an 8×8 square array 102 for our reduction to practice of this technique. Such an 8×8 square array 102 with 2-mm spacing is shown in FIG. 7. Each element has a diameter of 1-mm. We have selected element number 29 as the reference element for the correlations.

Figure 8:
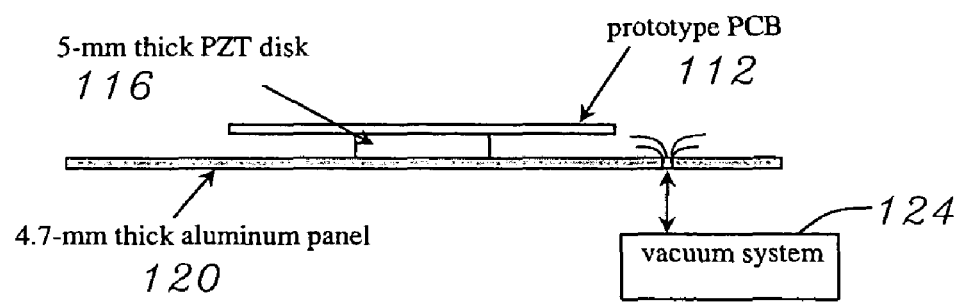
FIG. 8 is cross-sectional view of the 64-element piezoelectric array.

The prototype PCB 112 includes all the components, except a PZT disk 116 and computer 118. All of the electrical components are surface mounted type and placed on a 3"×3" PCB 112, and a PZT disk 116 is chosen as an active component to monitor the structure borne leak noise. The PZT array sensor 100 includes a 32 channel mux 104 electrically connected to a preamp 108 and a second 32 channel mux 106 electrically connected to a second preamp 110. Integrated electronics 114 are also provided on the PCB 112. The choice of the PZT disk 116 is dictated by the need to have high sensitivity and its resonant frequency. We choose a 30-mm in diameter, 7-mm thick PZT disk, which is the thickest PZT disk with a diameter of 30 mm commercially available on the market. To provide electrical contract with the plate during the experiments, one side of the PZT disk is metalized with Silver. However, there is no metal layer on the other side. Instead, the square array pattern shown in FIG. 8 is fabricated on the backside of the prototype PCB 112, and tightly contact with the surface of the PZT disk 16.

Figure 9:
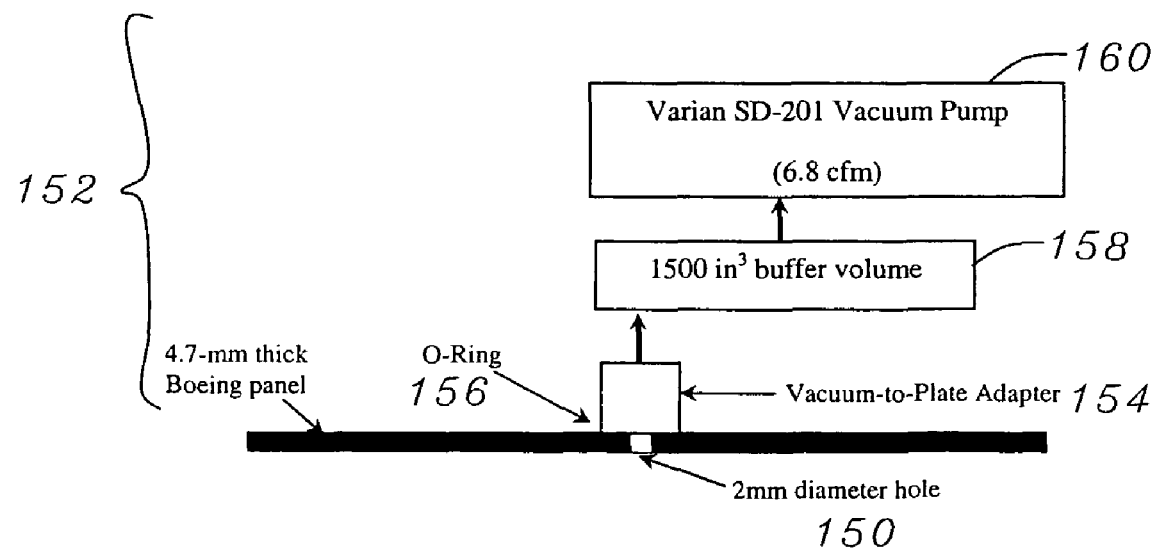
FIG. 9 illustrates a panel with a leak.

During the data collection, the metalized side of the PZT disk 116 is in intimate contact with the plate-like specimen, which itself is electrically grounded. When an element is addressed by a computer 118, the element reports the time-varying elastodynamic field in the PZT disk 116 at the particular element location. The resulting electrical signal is cross-correlated with the signal measured by the reference element. FIG. 9 shows a 64-element PZT array sensor prototype in cross-sectional view during operation. While data is being collected, the PZT disk 116 is held in tight contacted with the plate 120, and mineral oil is used as a coupling medium to assure high sound transmission. A leak 122 into a vacuum system 124 is shown. After all the data are collected, they are processed using the leak detection algorithm.

Figure 10:
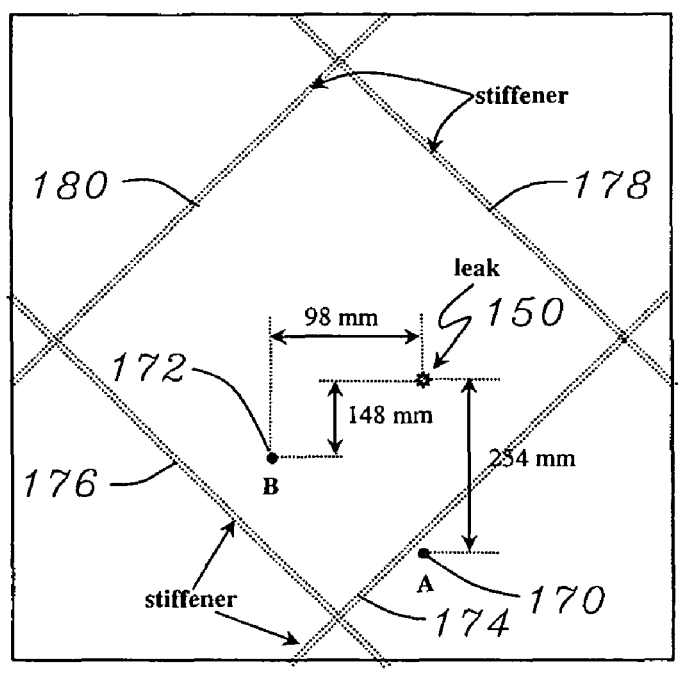
FIG. 10 is a schematic diagram of a vacuum system.

A prototype of the array sensor has been tested on a 4.76-mm thick, integrally stiffened aluminum panel acquired from Boeing Aerospace. The panel has four 20-mm high and 4.76-mm thick stiffeners across the rear side of the panel. The schematic diagram of the panel specimen is shown in FIG. 10. To simulate atmosphere leaking from a habitable, space-based environment into the vacuum of space, an air leak is introduced by drawing air through a 2-mm diameter hole 150 using a customized vacuum system 152. The vacuum system 152 consists of a vacuum-to-plate adapter 154 with O-ring 156, 1500-liter buffer volume 158 and a vacuum pump 160 capable of pumping 6.8 liters per minute of air. FIG. 9 shows the schematic diagram of the vacuum system 152.

In order to efficiently demonstrate its capability of locating a leak, we select two test points on the panel as shown in FIG. 10. Test point 'A' 170 is located at 254 mm straight below the leak 150. But there is a stiffener 174 between the leak 150 and the test point 170. Test point 'B' 172 is located at 98 mm below and 148 mm left of the leak 150. The coordinates of each test point are assumed to be the location of a reference element in the prototype, which is near the center of the array. During the data acquisition process, the waveform at each element is averaged 20 times, differentiated, band-pass filtered, and down-sampled from $5 \times 10^6$ samples/waveform to $1.25 \times 10^6$ samples/waveform. Then, it is segmented into 1000 samples before cross-correlation.

Since all elements are integrated in a single 16-mm square unit, including the reference element, we obtain the direction to the leak at each test point every experiment. This approach reduces the computations needed to estimate the direction of the leak source.

Once the mean cross-correlated signals are acquired at each element, the signals are Fourier transformed in time and in two spatial dimensions (x and y). Then, the energy distribution of the measured signals over the frequency range of 200-500 kHz is plotted in the $k_x$-$k_y$ plane. In the $k_x$-$k_y$ plane, the direction to the maximum energy distribution is the direction to the source of the noise, presumably the leak.

Figure 11:
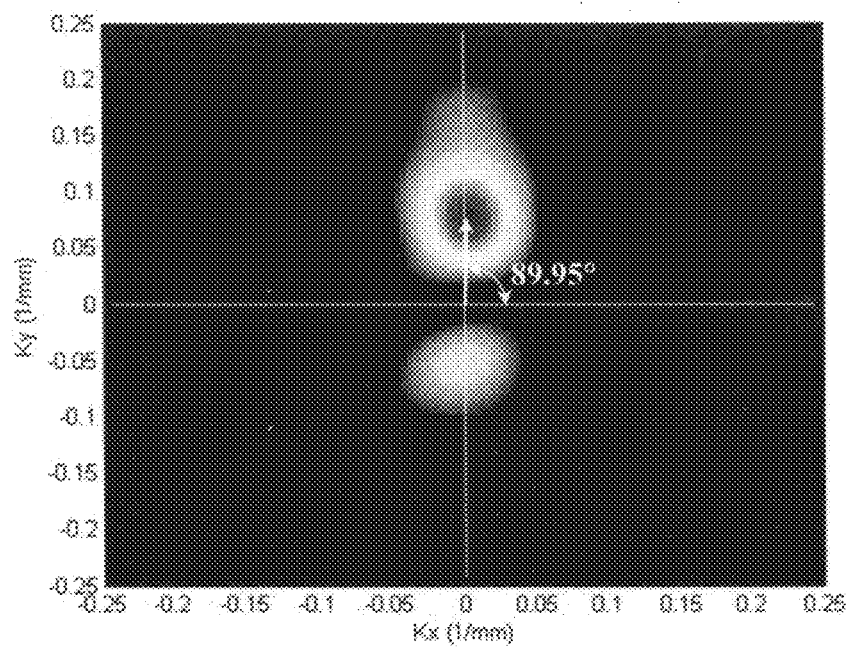
FIG. 11 illustrates measured spatial frequency spectra at a location A.

FIG. 11 shows that an estimated direction to the leak from test point 'A' is 89.95°, compared with the actual direction of 90°. The variations between the estimations and actual values are within the precision of the method and small enough to be negligible in practice. As expected, there is also a weak false indication in the opposite direction caused by the reflections from the plate edges. Although we have observed weak false indications, the prototype sensor and the leak location algorithm show excellent performance even in the presence of the stiffener, which would make the operation of a conventional single-sensor detector nearly impossible. In our experimental configuration, the ratio of the panel's thickness to the stiffener's height is approximately 4.2 (=20-mm/4.7-mm). The effect of the ratio on the leak location has been investigated further.

Figure 12:
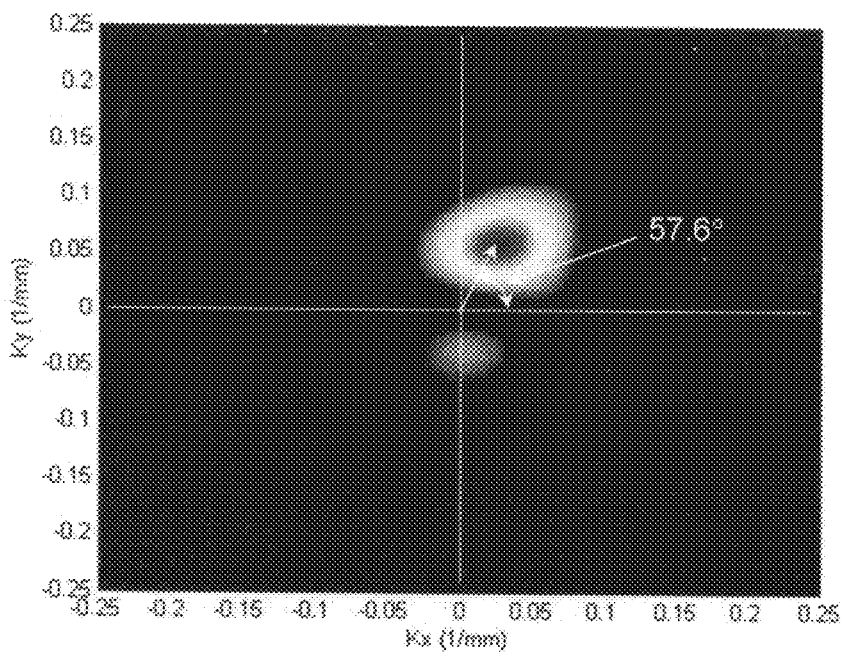
FIG. 12 illustrates measured spatial frequency spectra at a location B.

Estimated directions to the leak source from test point 'B' are shown in FIG. 12. Compared with the actual direction of 56.5°, an estimated direction at test point 'B' is found to be 57.6°. The difference between the estimation and actual direction to the leak is small enough to be considered negligible for our purposes. When the prototype sensor is rotated clockwise through 90° at test point 'B' the direction to the leak is found to be 144.9°, compared with the actual angle of 144.6°. This shows marginally better performance than the previous experiments in which the prototype is not rotated. We speculate that it is caused by the misalignments of the reference point in the prototype with the location of test point 'B'. In addition to the misalignment, it also occurs because the prototype is not fully rotated 90° in the clockwise direction. However, we can minimize such unwanted error by taking the measurements at more than two points.

Figure 13:
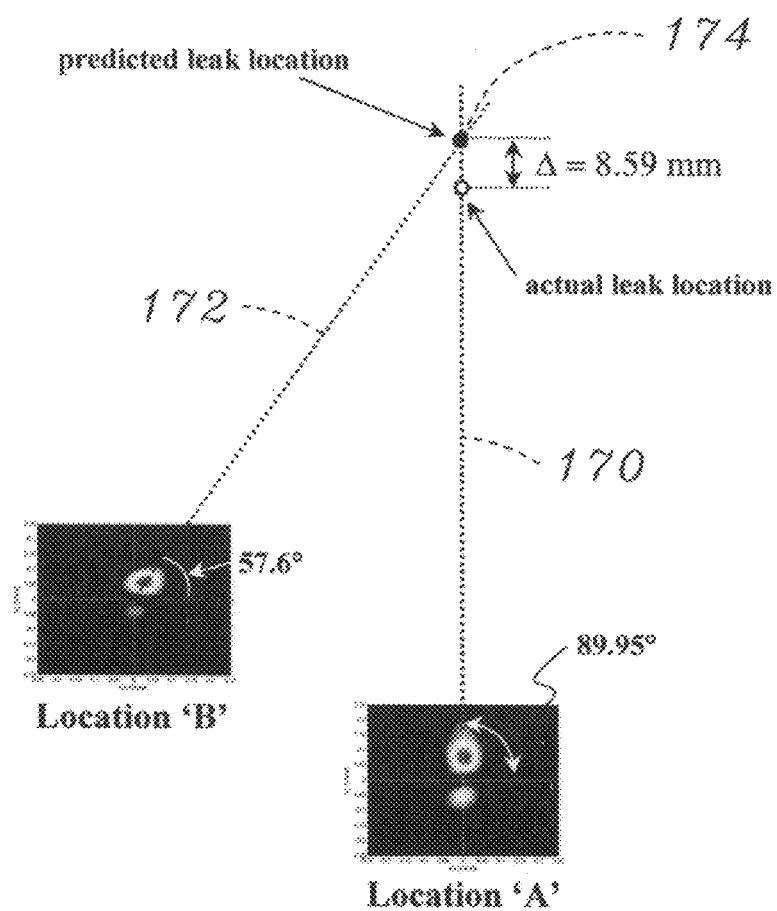
FIG. 13 illustrates leak location determination by two individual experiments at the test point 'A' and 'B'.

Once the estimated directions are obtained, we readily find the location of the leak by extending lines toward the resulting directions at test points 'A' and 'B'. The line is simply drawn from the origin to the direction of the maximum in the energy distribution in the plot. The intersection of the lines is then the estimated location of the leak. FIG. 13 shows the location of the leak estimated by extending the lines 170, 172 in the direction of 89.5° and 57.6° at test points 'A' and 'B' respectively. The two lines 170, 172 meet at a point 174 which is 8.59 mm, directly above the actual leak.

The described array sensor is effective in locating a leak in a plate-like structure with the requisite speed and acceptable accuracy, when the leak is from within the vessel to a vacuum outside. In addition, the sensitive and sophisticated algorithm can pinpoint the location of a leak within an acceptable experimental uncertainty. Of course, the present invention contemplates numerous variations in the design and construction of an array system which can be used in conjunction with the methodology of the present invention, including differences in array size, frequencies used, and other variations.

Thus, the present invention provides for leak detection and the determination of leak location in a pressure vessel through sensing structure-borne ultrasound waveforms associated with turbulence caused by the leak. The determination of leak location uses cross-correlations of the sensed data. In all of the leak location methods discussed, cross correlation is relied upon to compensate for the random nature of the leak noise signal. The cross correlation transforms a pair of measured leak noise waveforms into a reproducible function of the leak noise spectrum, geometry, and elastic coupling. Even in the more complicated case of multimode propagation and dispersion (modal velocities that vary with frequency), the cross correlation remains a reproducible function of the leak noise and the sensor parameters.

The present invention provides for numerous variations in the type of pressure vessel used, number of sensors used, placement of sensors, and corresponding methodologies for leak detection and location including the manner in which cross correlation is used. The present invention is not to be limited merely to what is specifically described herein and one skilled in the art and having the benefit of this disclosure will appreciate the broad spirit and scope of the invention.

4. REFERENCES

All references listed herein are hereby incorporated by reference in their entireties.

[1] J. L. Foster, *A debris avoidance feasibility study for robotic satellites*, The Orbital Debris Quarterly News, 8(3), 2-3, 2004.

[2] E. Stansbery, J. Foster, and C. Stokely, *Haystack orbital debris Radar measurements updates*, The Orbital Debris Quarterly News, 9(1), 3-5, 2005.

[3] P. H. Crisco, *Historical small debris collision activities*, The Orbital Debris Quarterly News, 8(4), 6-7, 2004.

[4] J. C. Liou, *Collision activities in the future orbital debris environment*, The Orbital Debris Quarterly News, 8(4), 8, 2004.

[5] R. P. Bernhard and E. L. Christiansen, *Orbital debris as detected on exposed spacecraft*, The Orbital Debris Quarterly News, 2(4), 3-4, 1997.

[6] W. P. Schonberg, *Protecting spacecraft against meteoroid/orbital debris impact damage*: An overview, Space Debris, 1, 195-210, 2000.

[7] P. Anz-Meador, *ISS Space Shuttles examined for debris impacts*, The Orbital Debris Quarterly News, 6(2), 3, 2001.

[8] J. Oberg, *Crew finds 'Culprit' in space station leak*, www.msnbc.msn.com, Jan. 11, 2003, (Date retrieved: Mar. 11th, 2005).

[9] S. Holland, R. Roberts, D. E. Chimenti, and M. Strei, *Two-sensor ultrasonic spacecraft leak detection using structure-borne noise*, Acoustic Research Letters Online (ARLO), 6(2), 63-68, 2005.

[10] National Aeronautics and Space Administration, *International space station complex operations emergency procedures: all expedition flights*, Mission Operations Directorate Operations Division, Aug. 16, 2000.

[11] J. W. Kim, J. L. Crassidis, S. R. Vadali, and A. L. Dershowitz, *ISS leak localization using attitude response*, AIAA Guidance, Navigation, and Control Conference, Montreal, CA, August 2001, AIAA paper #01-4272.

[12] A. Zak, *Cosmonauts' flight plan: find the leak on MIR*, www.space.com, Mar. 31, 2000, (Date retrieved: Mar. 23rd, 2005).

[13] N. D. Semkin, A. N. Zanin, K. E. Voronov, and A. A. Kirillov, *A device for detecting the location of a gas leak in a spacecraft module*, Instru. Exper. Techn., 46(5), 711-716, 2003.

[14] G. Studor, *Ultrasonic Detectors in Space*, www.ctrlsys.com, May 22, 2002, (Date retrieved: Mar. 23rd, 2005).

[15] R. Corsaro, F. Giovane, P. Tsou, J. -C. Liou, D. Buzasi and B. Gustafson, *PINDROP—An acoustic particle impact detector*, The Orbital Debris Quarterly News, 8(3), 3-4, 2004.

[16] J. W. Kim, J. L. Crassidis, S. R. Vadali, and A. L. Dershowitz, *International space station leak localization using vent torque estimation*, 55th International Astronautical Conference, Vancouver, BC, IAC-04-A.4.10, October 2004.

[17] Anon, "Stopping leaks in space", Machine Design, 75, 32, 2003.

[18] P. H. White, *Cross correlation in structural systems: dispersion and nondispersion waves*, Journal of the Acoustical Society of America V. 45 pp. 1118-1128, 1969.

[19] S. M. Ziola, and M. R. Gorman, *Source location in thin plates using cross-correlation*, J. Acou. Soc. Am., 90, 2551-2556, 1991.

[20] L. E. Rewerts, R. A. Roberts, and M. A. Clark, *Dispersion compensation in acoustic emission pipeline leak location*, in Review of Progress in QNDE, 16A, 427-434, 1997.

[21] L. E. Rewerts, R. A. Roberts, and M. A. Clark, *The role of propagation characteristics in acoustic emission pipeline leak location*, in Review of Progress in QNDE, 17A, 501-508, 1998.

[22] M. Strei, R. Roberts, S. Holland, and D. E. Chimenti, *Leak location in plates: compensation for multimode dispersion*, Review of Progress in QNDE, 23B, 1398-1405, 2003.

[23] M. Strei, *Acoustic source location in plate-like structure*, thesis, Iowa State University, 2004.

What is claimed is:

1. A method for detection of an air leak from a pressure vessel, comprising:

sensing structure-borne ultrasound waveforms from a plurality of sensors;

performing a cross correlation of the structure-borne ultrasound waveforms;

determining from the cross correlation between the structure-borne ultrasound waveforms the location of the air leak from the pressure vessel.

2. The method of claim 1 wherein the ultrasound waveforms are associated with turbulence caused by the leak.

3. The method of claim 1 wherein the ultrasound waveforms are in a range of 300 kHz to 600 kHz.

4. The method of claim 1 wherein the plurality of sensors are configured as a two-dimensional phased array.

5. The method of claim 1 wherein the plurality of sensors are distributed on an inner surface of the pressure vessel.

6. The method of claim 1 wherein the plurality of sensors comprises two rotatable sensors, the method further comprising rotating the two rotatable sensors relative to the pressure vessel through electronic actuation.

7. The method of claim 1 wherein the pressure vessel is a spacecraft and wherein the air leak being into a vacuum.

8. An apparatus for detection of leaks from a pressure vessel, comprising:

a plurality of acoustic sensor arrays adapted for sensing structure-borne ultrasound waveforms associated with turbulence caused by a leak in the pressure vessel;

an intelligent control operatively connected to the plurality of acoustic sensor arrays, wherein the intelligent control being adapted for receiving a structure-borne leak noise waveform from each of the acoustic sensor arrays, cross correlating the structure-borne leak noise waveforms from the acoustic sensor arrays, and determining location of the air leak in the pressure vessel based on results of the step of cross correlating.

9. The system of claim 8 wherein the plurality of acoustic sensors are operatively connected to an inner surface of the pressure vessel.

10. The system of claim 9 wherein the pressure vessel is a spacecraft.

11. A method for location of an air leak from a pressure vessel comprising:

receiving a structure-borne leak noise signal associated with the air leak from the pressure vessel at a plurality of sensor locations to provide a plurality of structure-borne leak noise waveforms;

cross correlating the structure-borne leak noise waveforms;

determining location of the air leak in the pressure vessel based on results of the step of cross correlating the structure-borne leak noise waveforms.

12. The method of claim 11 further comprising a plurality of sensor parameters associated with the plurality of sensor locations and wherein the results being a function of the structure-borne leak noise waveforms and the sensor parameters.

13. The method of claim 11 wherein the sensor parameters include the sensor locations.

14. The method of claim 11 wherein the step of determining location of the leak based on the cross correlation comprises applying a Fourier analysis to determine direction to the leak from each of the plurality of sensors, and triangulating the location of the air leak.

\* \* \* \* \*